United States Patent
Mishra et al.

(10) Patent No.: US 11,606,493 B2
(45) Date of Patent: Mar. 14, 2023

(54) METHOD FOR RECORDING MULTIMEDIA FILE AND ELECTRONIC DEVICE THEREOF

(71) Applicant: Samsung Electronics Co., Ltd., Suwon-si (KR)

(72) Inventors: Abhishek Mishra, Noida (IN); Ramendra Singh Bhadouriya, Noida (IN); Saurabh Tiwari, Noida (IN); Gaurav Sikarwar, Noida (IN); Kaushal Prakash Sharma, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/294,359

(22) PCT Filed: Nov. 13, 2019

(86) PCT No.: PCT/KR2019/015470
§ 371 (c)(1),
(2) Date: May 14, 2021

(87) PCT Pub. No.: WO2020/101362
PCT Pub. Date: May 22, 2020

(65) Prior Publication Data
US 2021/0385369 A1    Dec. 9, 2021

(30) Foreign Application Priority Data
Nov. 14, 2018   (IN) .............................. 201841042886

(51) Int. Cl.
*H04N 5/232* (2006.01)
*G06N 3/04* (2006.01)
(Continued)

(52) U.S. Cl.
CPC ........... *H04N 5/23218* (2018.08); *G06N 3/04* (2013.01); *H04N 5/23245* (2013.01); *H04N 5/772* (2013.01); *H04N 5/783* (2013.01)

(58) Field of Classification Search
CPC ...... H04N 5/23245; H04N 5/783; H04N 5/77; H04N 5/232; H04N 5/23218; H04N 5/772; G06N 3/04
(Continued)

(56) References Cited

U.S. PATENT DOCUMENTS 7,545,434 B2   6/2009   Bean et al.
8,179,466 B2   5/2012   Border et al.
(Continued)

FOREIGN PATENT DOCUMENTS

CN   101534406 A   9/2009
CN   107396019 A   11/2017
(Continued)

OTHER PUBLICATIONS

International Search Report dated Mar. 2, 2020 in connection with International Patent Application No. PCT/K2019/015470, 3 pages.
(Continued)

*Primary Examiner* — Thai Q Tran
*Assistant Examiner* — Nienru Yang

(57) ABSTRACT

This present disclosure provides a method for recording a multimedia file using an electronic device. The method includes previewing a scene comprising a plurality of objects in a field of view of a camera of the electronic device and detecting at least one of a shape event and a sound event associated with at least one object from the plurality of objects in the scene. Further, the method includes determining at least one of a recoding mode and an effect for the at least one object based on at least of the sound event and the shape event and applying at least one of the recording mode (Continued)

and the effect. The method also includes recording the multimedia file comprising the at least one object in at least one of the recording mode video and the effect and storing the multimedia file.

20 Claims, 19 Drawing Sheets

(51) Int. Cl.
*H04N 5/77* (2006.01)
*H04N 5/783* (2006.01)

(58) Field of Classification Search
USPC .......................................................... 348/169
See application file for complete search history.

(56) References Cited

U.S. PATENT DOCUMENTS

| | | | |
|---|---|---|---|
| 9,836,484 B1 | 12/2017 | Bialynicka-Birula et al. | |
| 2007/0222877 A1* | 9/2007 | Ku | H04N 5/3454 348/E3.02 |
| 2010/0208093 A1 | 8/2010 | Lee et al. | |
| 2011/0064129 A1 | 3/2011 | Bennett et al. | |
| 2013/0308829 A1* | 11/2013 | Kawanishi | G06V 20/49 382/118 |
| 2015/0222845 A1 | 8/2015 | Nikara et al. | |
| 2015/0256749 A1 | 9/2015 | Frey et al. | |
| 2017/0178687 A1* | 6/2017 | Tamir | H04N 17/002 |
| 2017/0331978 A1 | 11/2017 | Takahashi et al. | |
| 2018/0091728 A1* | 3/2018 | Brown | H04M 1/72403 |
| 2018/0241984 A1 | 8/2018 | Sun et al. | |
| 2018/0259613 A1* | 9/2018 | Hirata | H04N 5/23218 |
| 2018/0285679 A1* | 10/2018 | Amitay | G06T 11/001 |

FOREIGN PATENT DOCUMENTS

| | | |
|---|---|---|
| EP | 3188473 A1 | 7/2017 |
| EP | 3627511 A1 | 3/2020 |
| JP | 2017-204713 A | 11/2017 |
| KR | 10-1559583 B1 | 10/2015 |
| WO | 2016/107965 A1 | 7/2016 |

OTHER PUBLICATIONS

Written Opinion of the International Searching Authority dated Mar. 2, 2020 in connection with International Patent Application No. PCT/KR2019/015470, 7 pages.

Intellectual Property India, "Examination report under sections 12 & 13 of the Patents Act, 1970 and the Patents Rules, 2003" dated Mar. 22, 2021, in connection with Indian Patent Application No. 201841042886, 8 pages.

Pfeiffer, et al., "Scene Determination Based on Video and Audio Features", Multimedia Tools and Applications, Kluwer Academic Publishers, The Netherlands, Jan. 31, 2001, 23 pages.

Supplementary European Search Report dated Nov. 4, 2021, in connection with European Application No. 19883998.7, 11 pages.

* cited by examiner

[Fig. 1A]
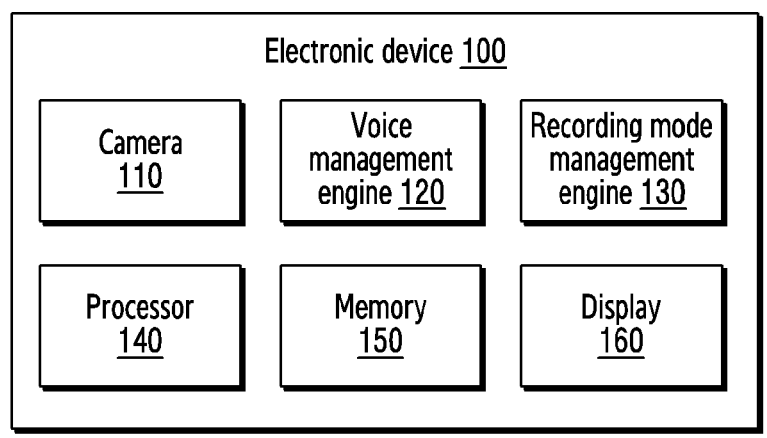

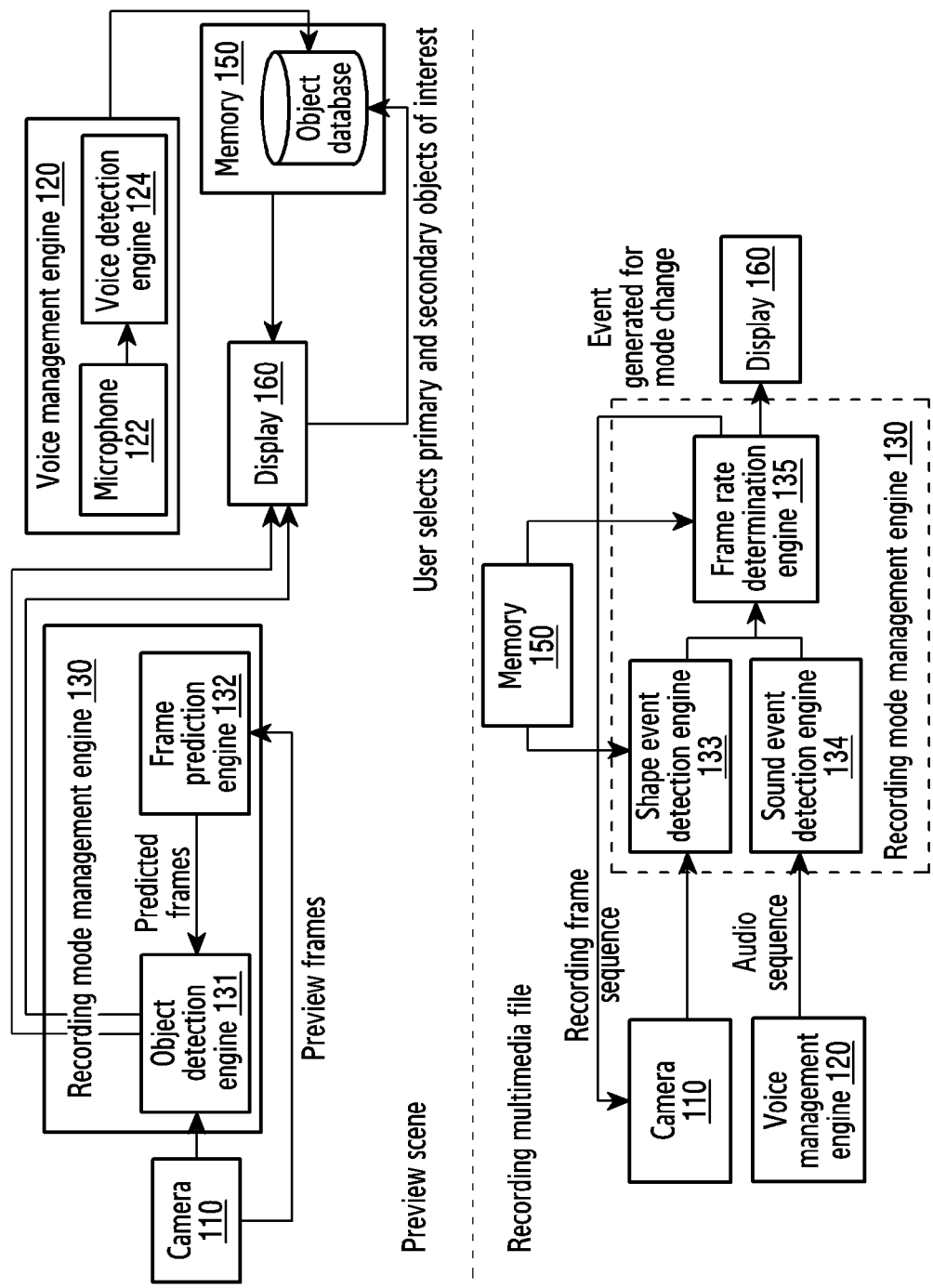
[Fig. 1B]

[Fig. 1C]
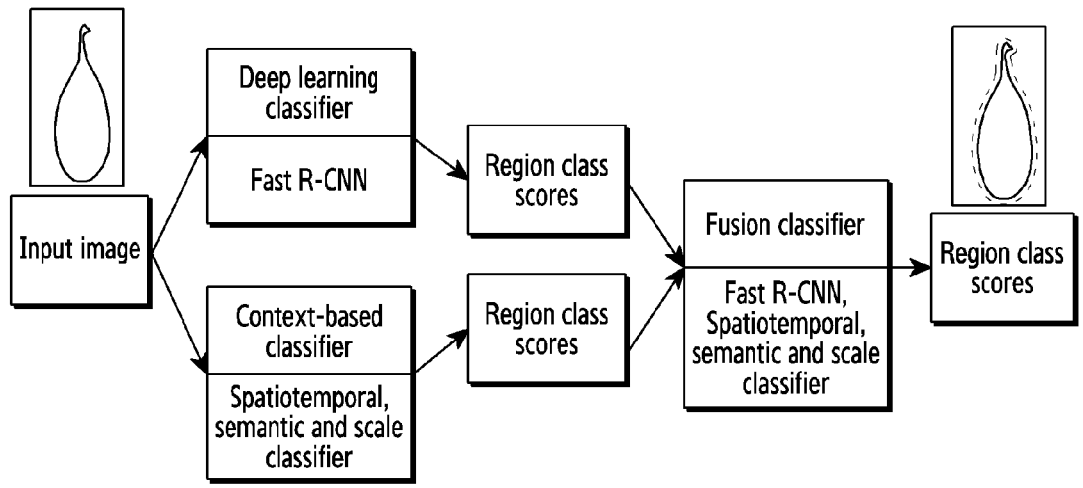
[Fig. 1D]
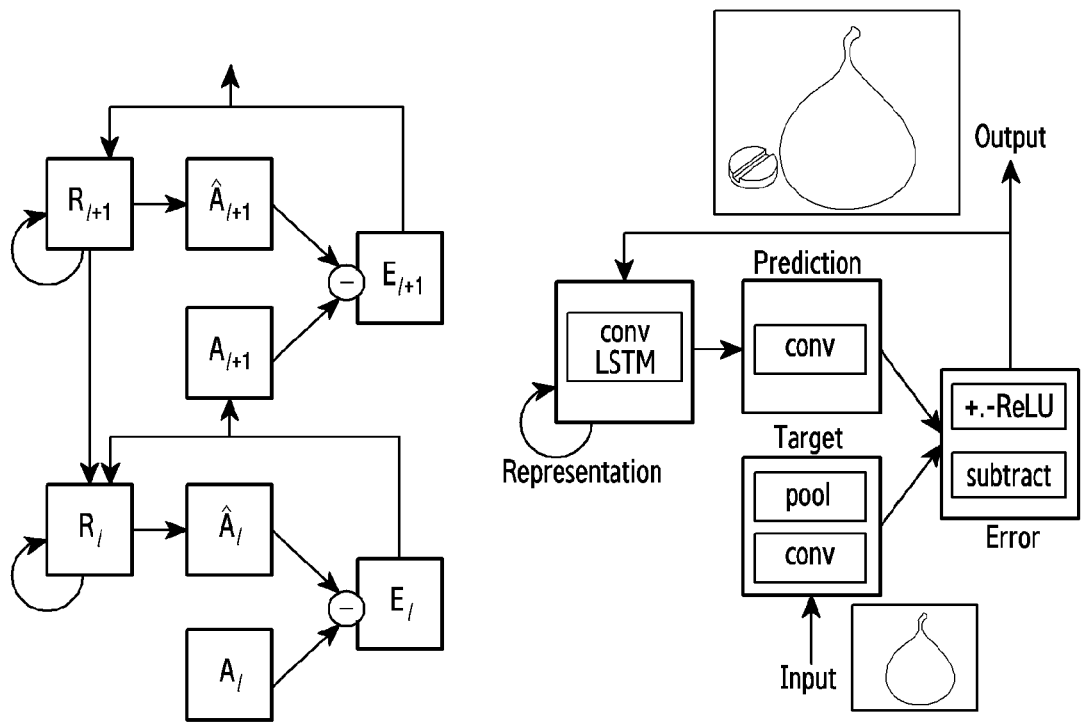

[Fig. 1E]
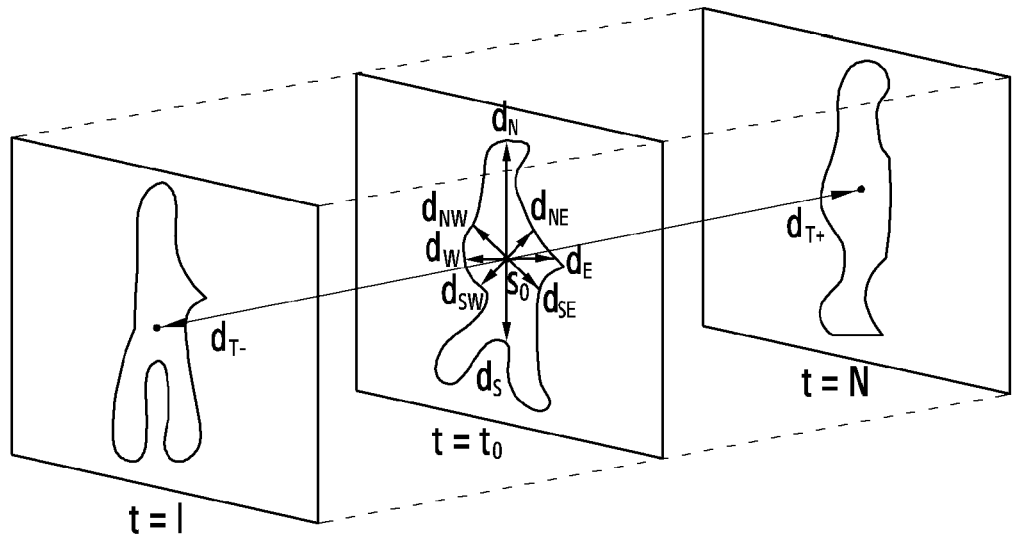
[Fig. 2A]
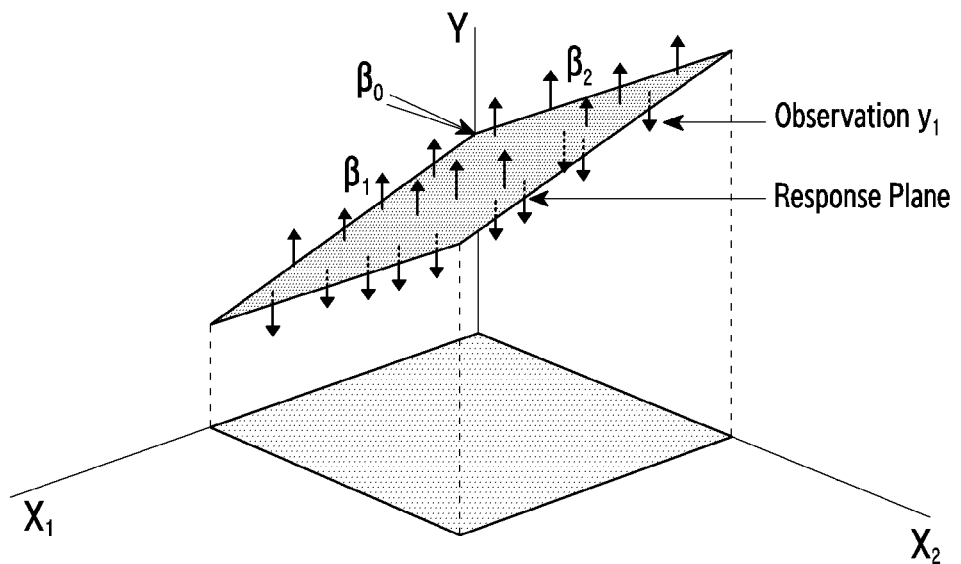
[Fig. 2B]
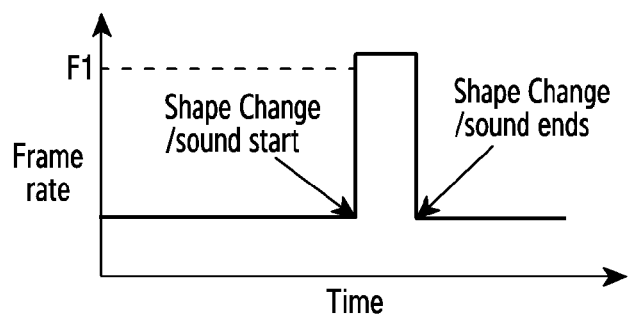

[Fig. 2C]
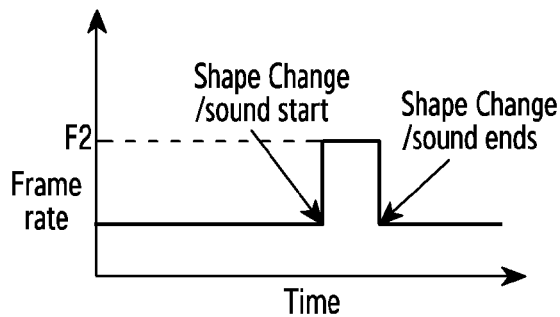
[Fig. 2D]
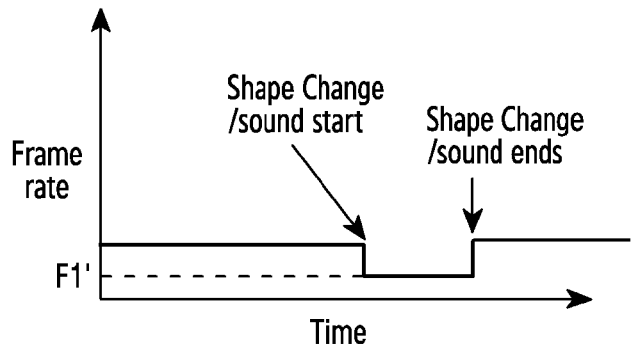
[Fig. 2E]
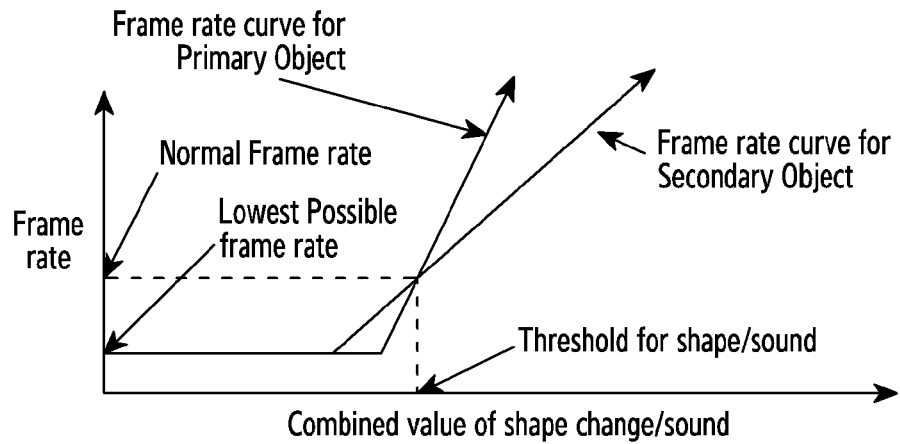

[Fig. 3]
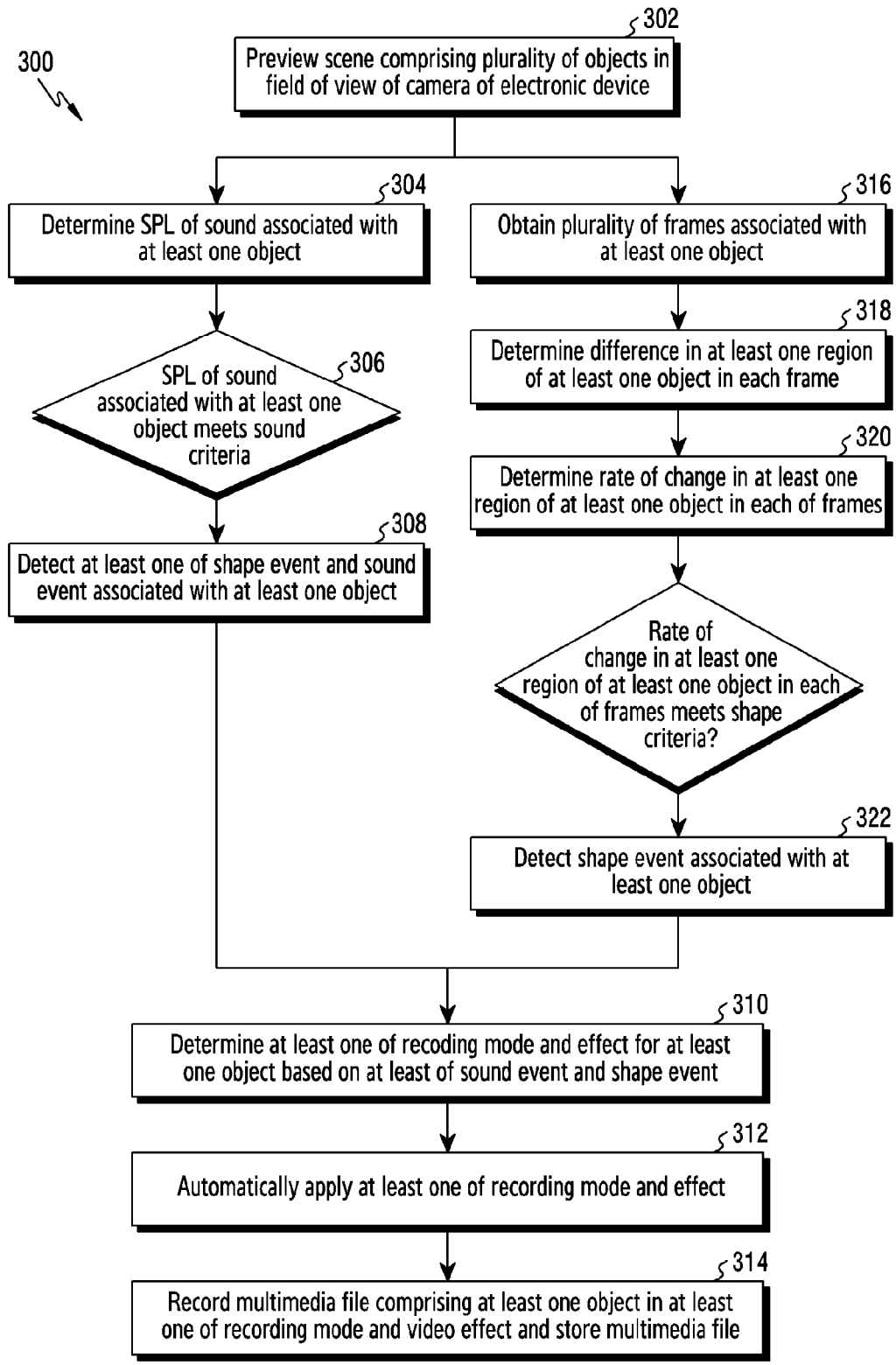

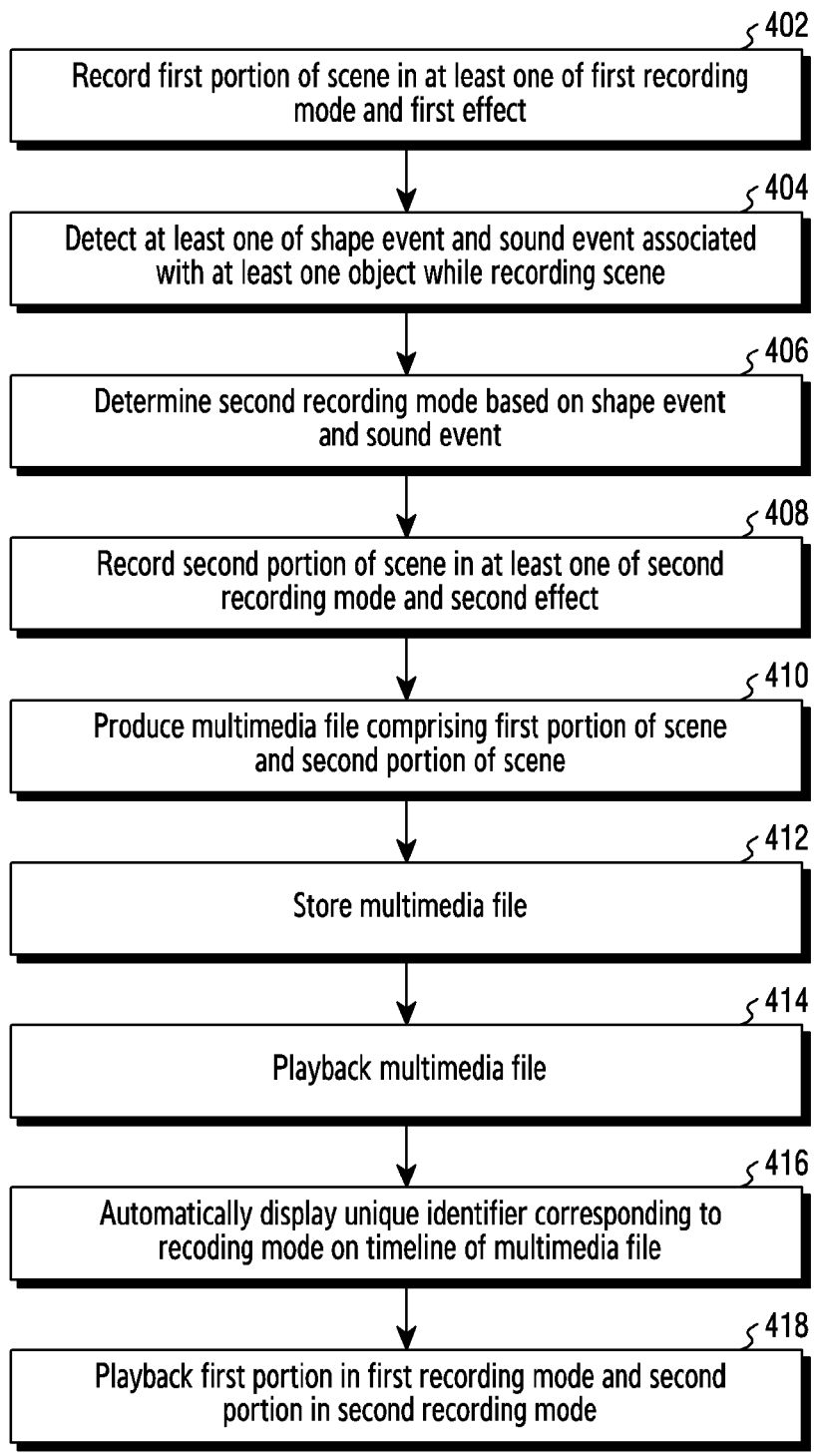
[Fig. 4]

[Fig. 5A]
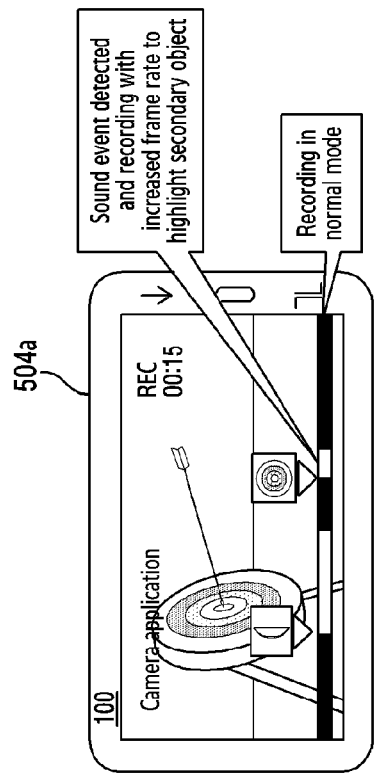
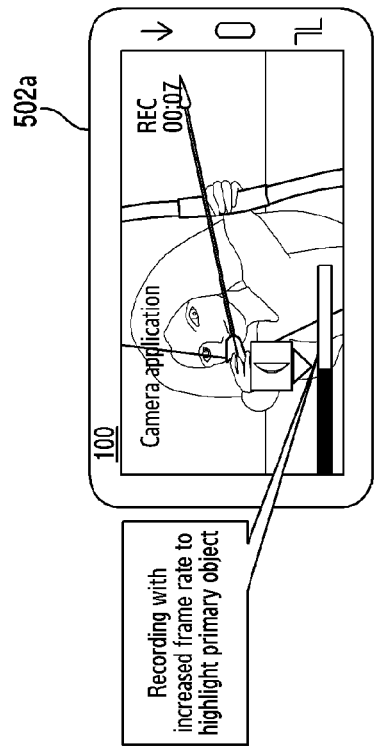

[Fig. 5B]
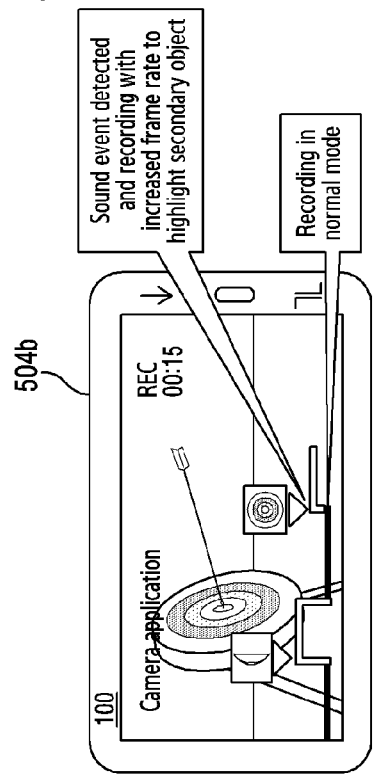
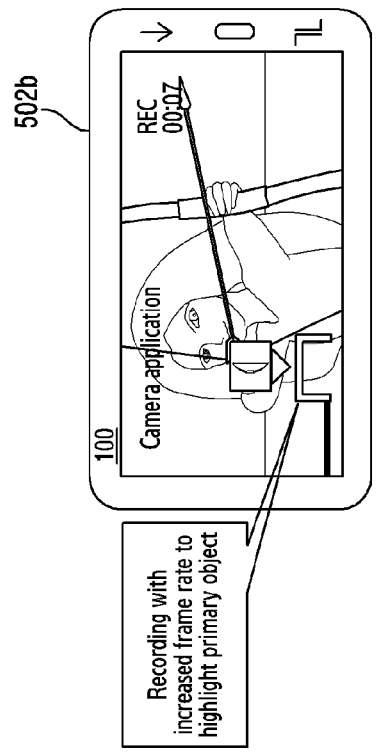

[Fig. 5C]
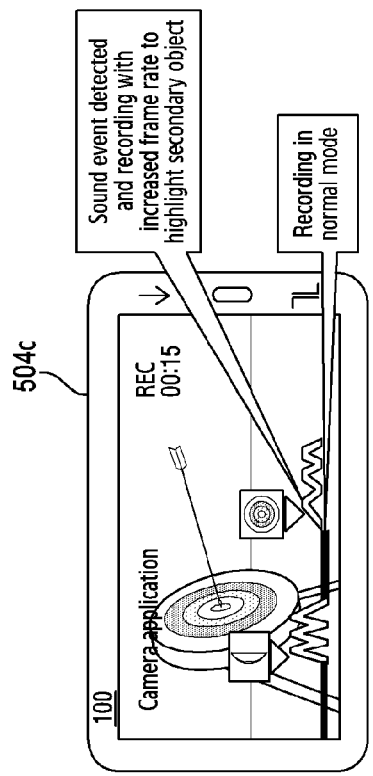
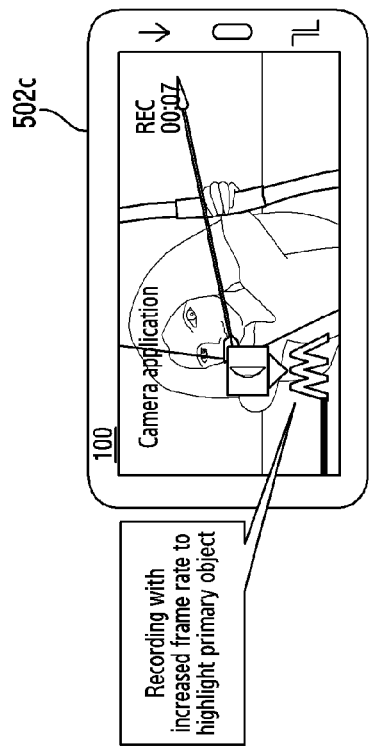

[Fig. 5D]
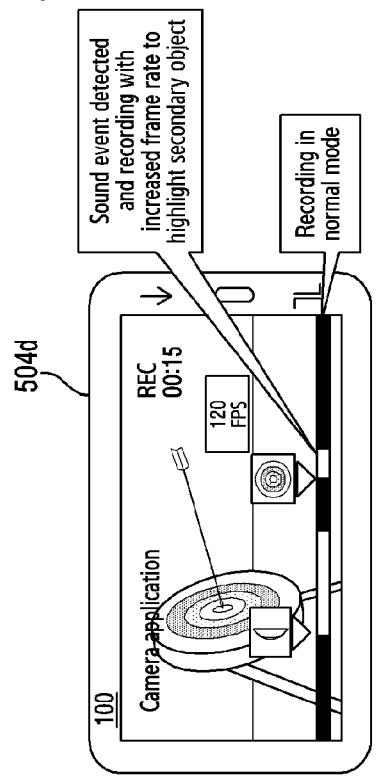
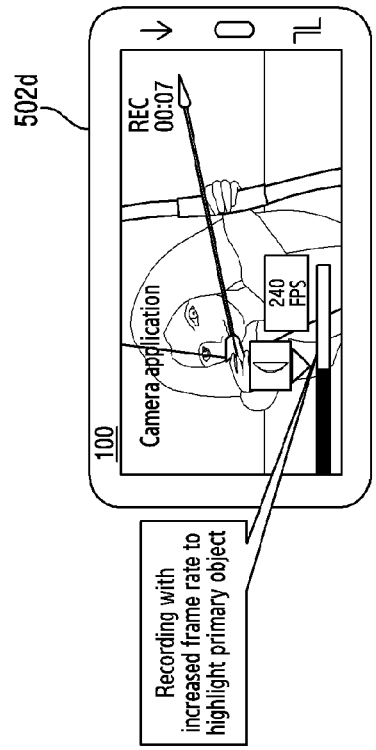

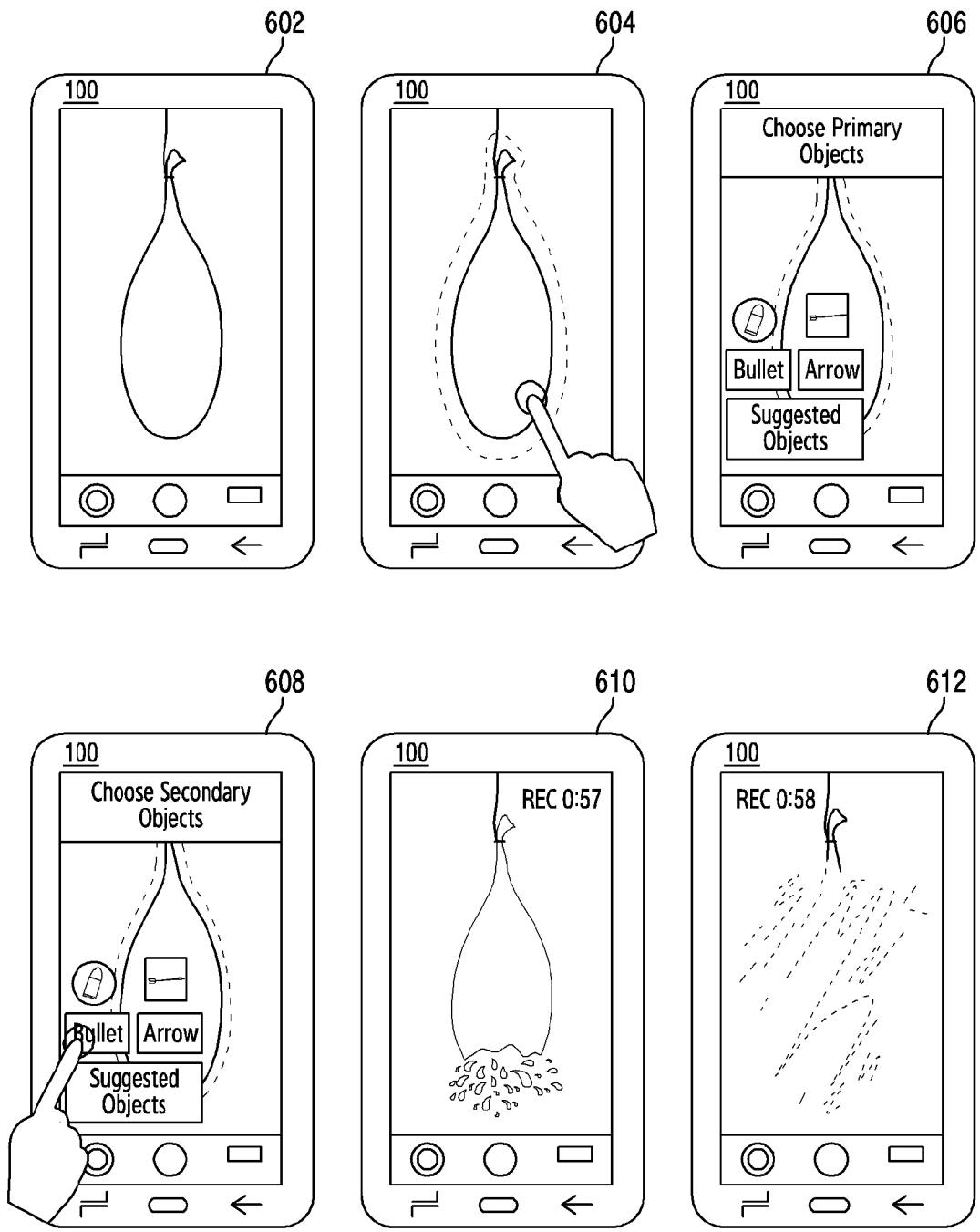
[Fig. 6]

[Fig. 7]
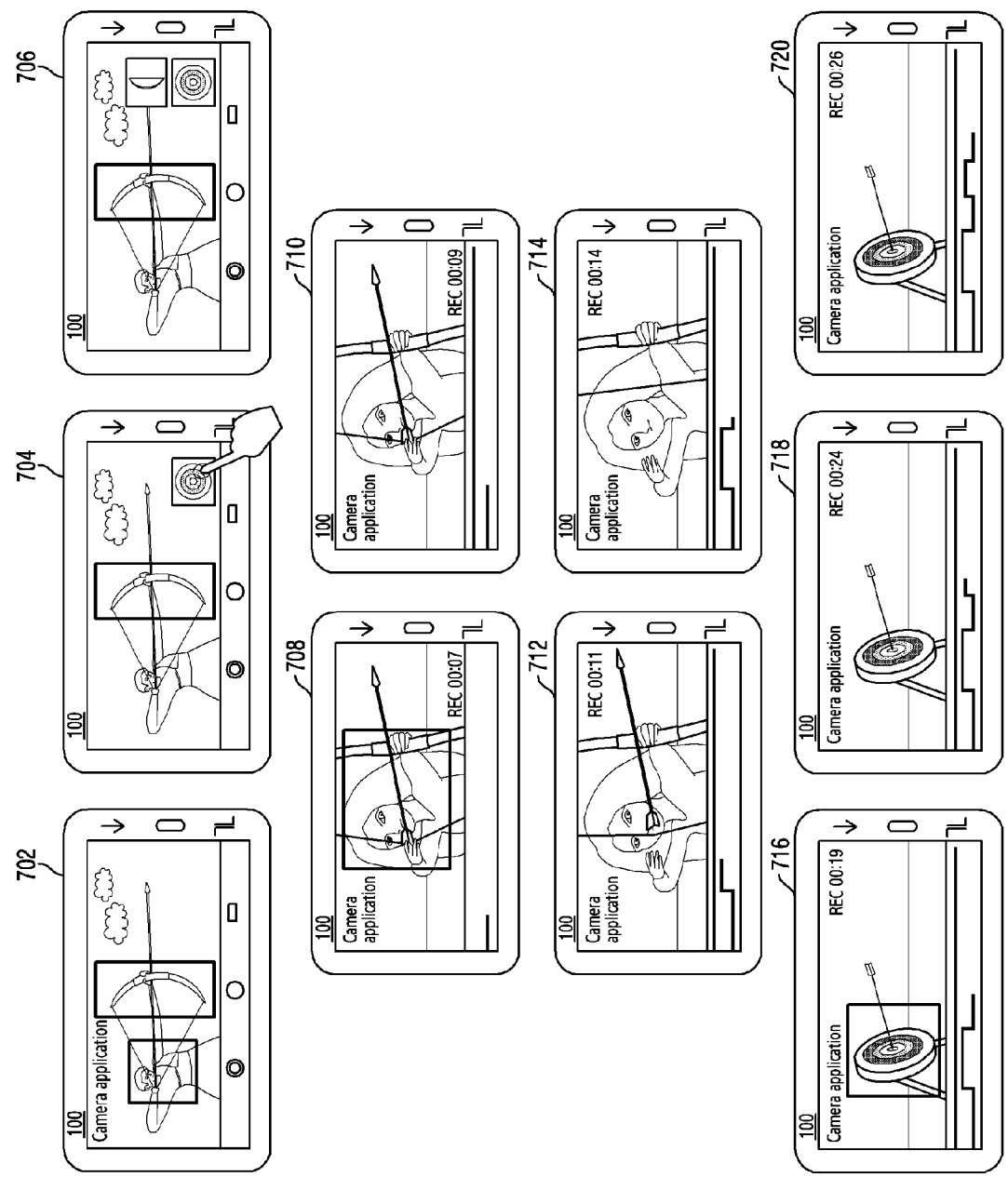

[Fig. 8]
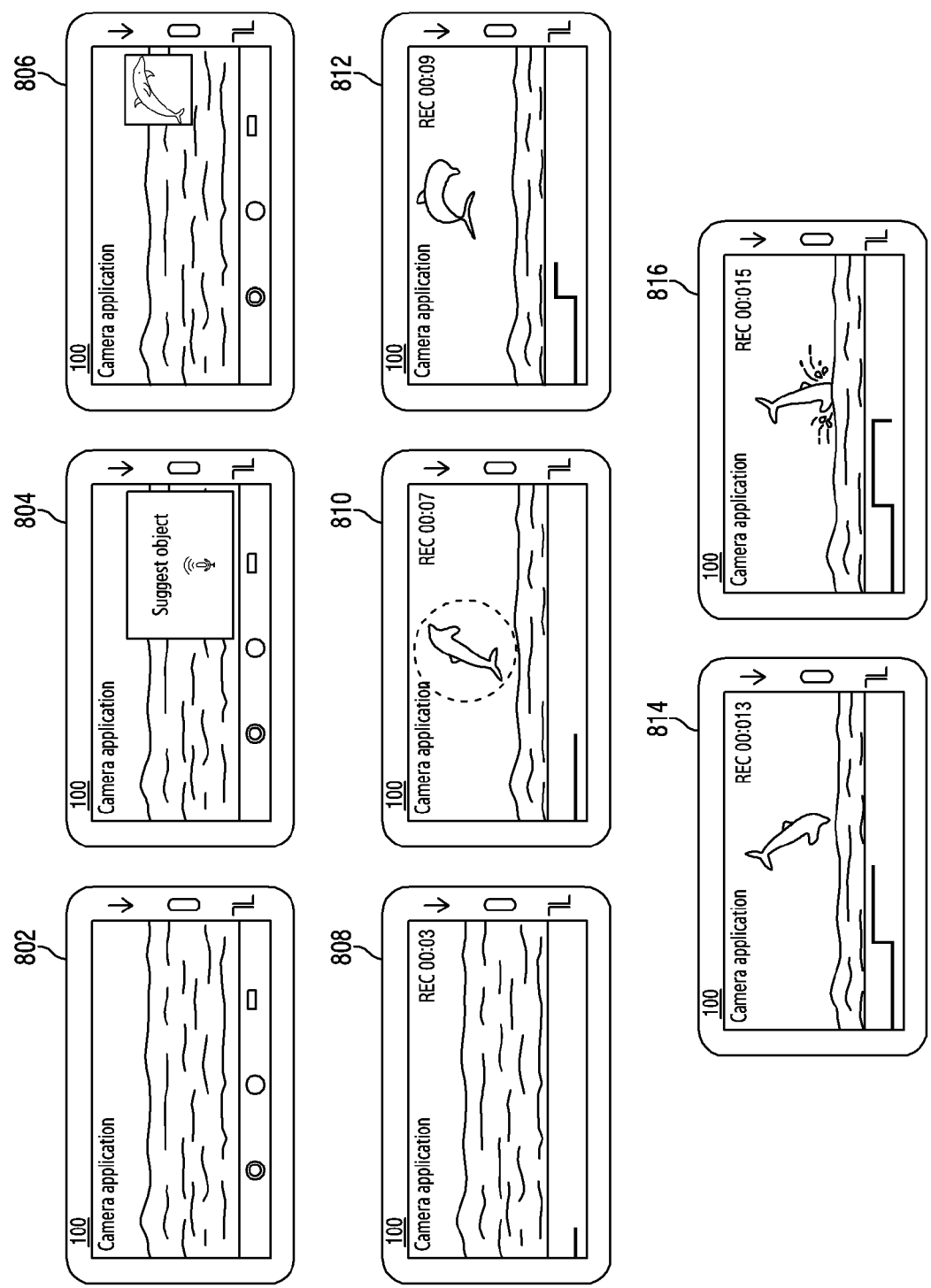

[Fig. 9]
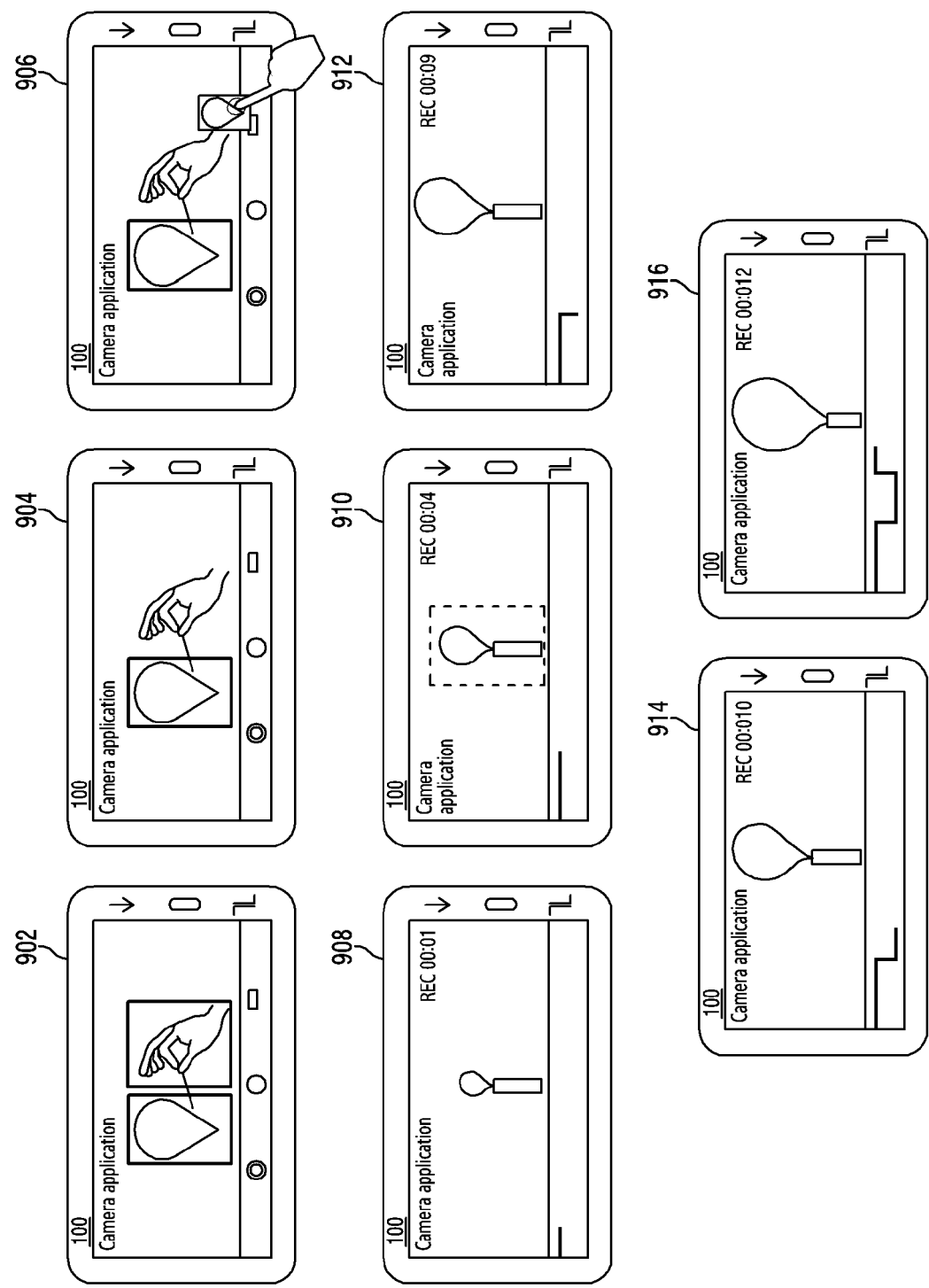

[Fig. 10]
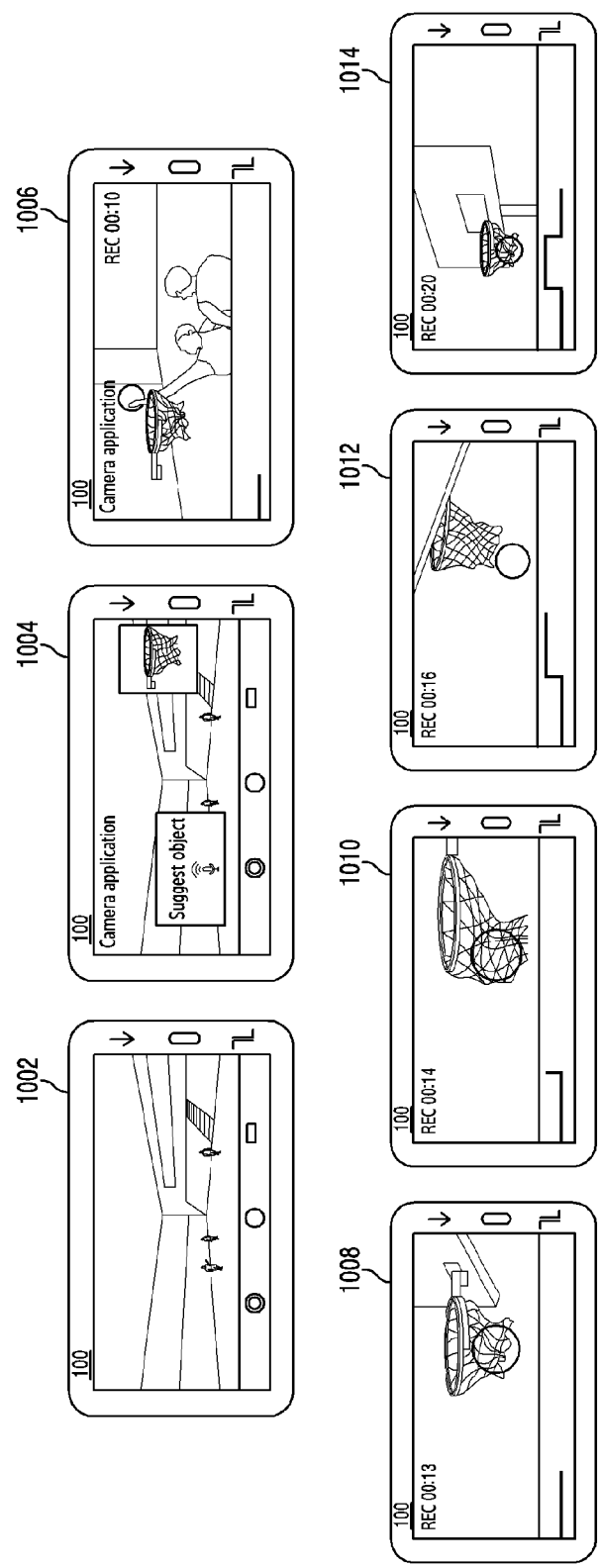

[Fig. 11]
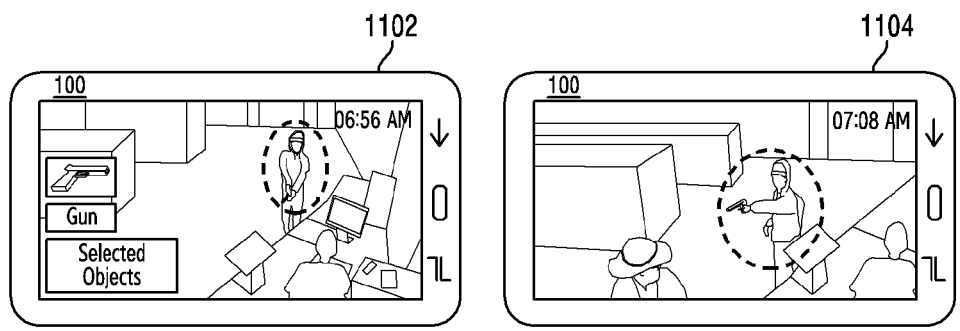
[Fig. 12]
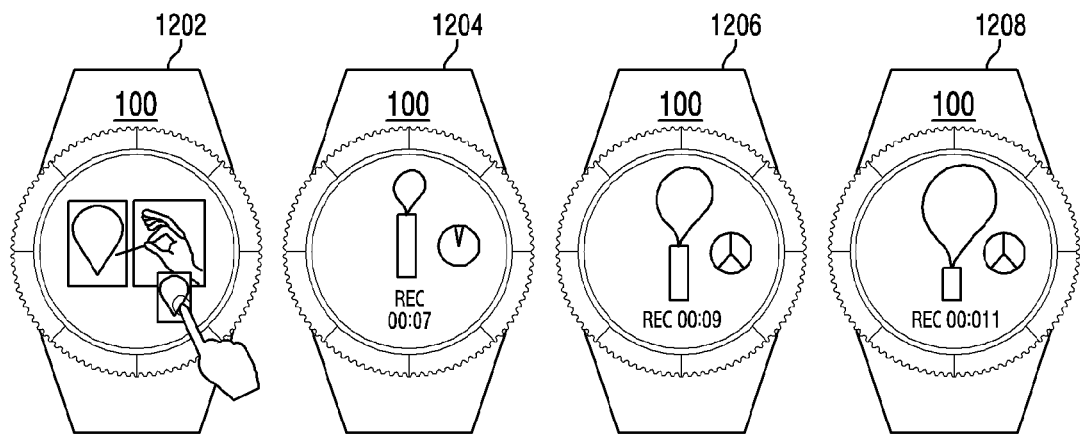

[Fig. 13]
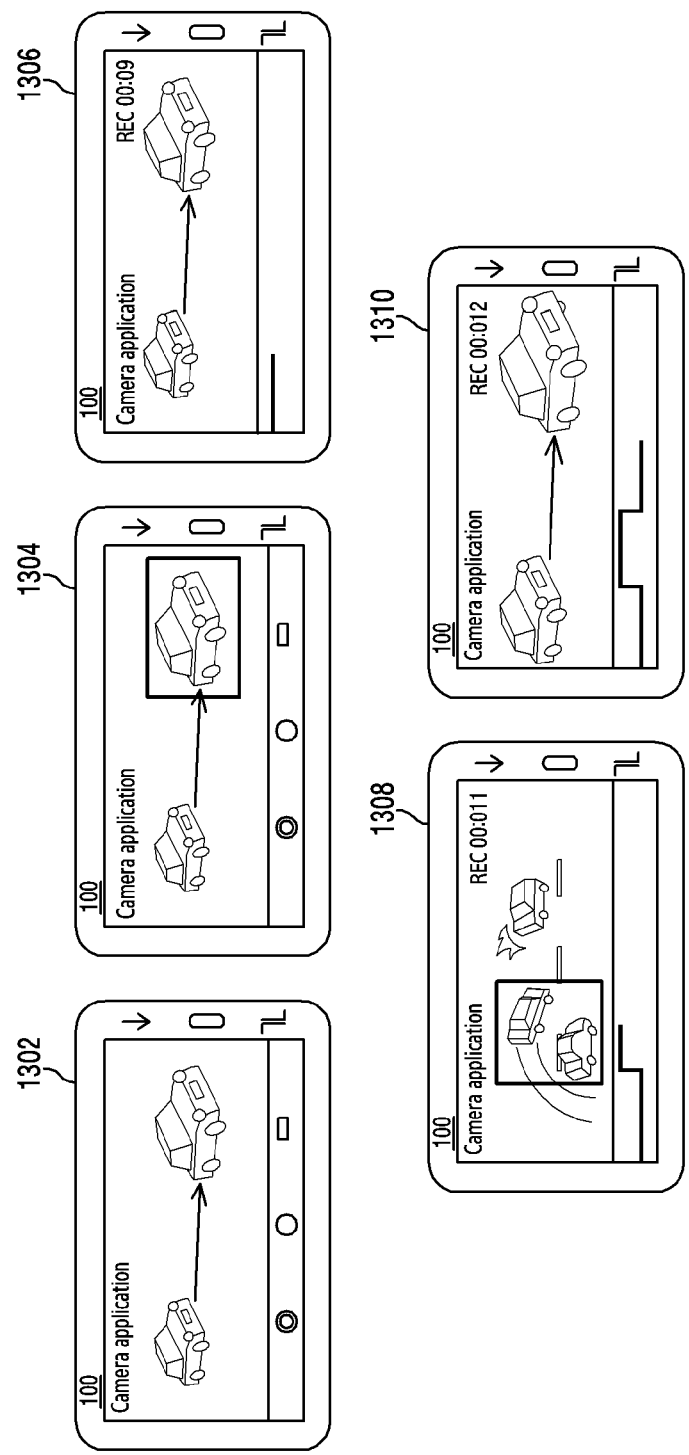

[Fig. 14]
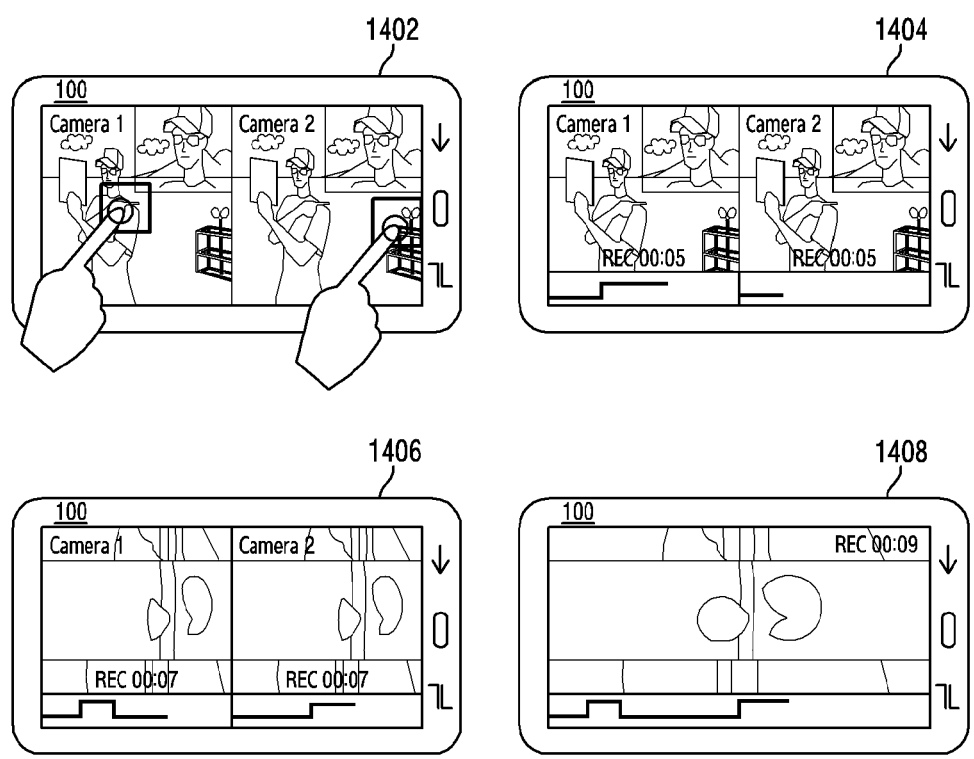

METHOD FOR RECORDING MULTIMEDIA FILE AND ELECTRONIC DEVICE THEREOF

CROSS-REFERENCE TO RELATED APPLICATIONS

This application is a 371 of International Application No. PCT/KR2019/015470 filed on Nov. 13, 2019, which claims priority to India Patent Application No. 201841042886 filed on Nov. 14, 2018, the disclosures of which are herein incorporated by reference in their entirety.

BACKGROUND

1. Field

The present disclosure relates to performing actions in an electronic device. More particularly relates to an electronic device and method for recording a multimedia file comprising at least one object in at least one of a recording mode and an effect.

2. Description of Related Art

In general, electronic devices are widely used for capturing and viewing multimedia files such as videos. However, when a user is capturing a video with an electronic device, the user has to manually apply the required effects to a particular portion of the video, as the process of capturing the video is not automated and creative to determine the required effects. Therefore, the process of manually applying the required effects every time the user captures a video makes the process cumbersome. Further, the effects applied by the user are highly dependent on the user's creativity and may not be an appropriate effect for the particular portion of the video. Mode switching mechanism is not automated or intelligent enough to do it by itself. For example, consider a scenario where the user is capturing a video of a person diving into a pool. The user would want to capture the diving in a slow motion mode along with a zoom-in effect to have focus on the person who is diving. However, by the time the user applies the slow motion mode and the zoom-in effect, there are possibilities that the person would have already jumped and the user has missed capturing a portion of the diving action.

The above information is presented as background information only to help the reader to understand the present disclosure. Applicants have made no determination and make no assertion as to whether any of the above might be applicable as prior art with regard to the present application.

SUMMARY

This disclosure provides a method and electronic device for recording a multimedia file. The method includes previewing a scene comprising a plurality of objects in a field of view of a camera of the electronic device and detecting at least one of a shape event and a sound event associated with at least one object from the plurality of objects in the scene. Further, the method includes determining at least one of a recoding mode and an effect for the at least one object based on at least of the sound event and the shape event and automatically applying at least one of the recording mode and the effect. The method also includes recording the multimedia file comprising the at least one object in at least one of the recording mode video and the effect and storing the multimedia file.

This disclosure also provides a method and electronic device for recording a multimedia file. The method includes recording a first portion of a scene in at least one of a first recording mode and a first effect and detecting at least one of a shape event and a sound event associated with at least one object while recording the scene. Further, the method also includes determining a second recording mode based on the shape event and the sound event and recording a second portion of the scene in at least one of the second recording mode and the second effect. The method also includes producing a multimedia file comprising the first portion of the scene and the second portion of the scene and storing the multimedia file.

This disclosure also will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which:

FIG. 1A is a block diagram of an electronic device for recording a multimedia file comprising at least one object in at least one of recording mode and effect, according to an embodiment as disclosed herein;

FIG. 1B illustrates the functions of the various elements of a recording mode management engine while determining the at least one object and recording the multimedia file after applying at least one of a recording mode and a effect, according to an embodiment as disclosed herein;

FIG. 1C is a block diagram of the object detection engine 131 for detecting the at least one object in the scene, according to an embodiment as disclosed herein;

FIG. 1D is a block diagram of the frame prediction engine 132 of the recording mode management engine 130, according to an embodiment as disclosed herein;

FIG. 1E is an example illustrating the method of detecting the shape event by the shape event detection engine 133, according to an embodiment as disclosed herein;

FIG. 2A is a model of the frame rate determination engine 135 for determining the frame rate based on at least one of the shape event and the sound event associated with the at least one object, according to an embodiment as disclosed herein;

FIGS. 2B-2E are graphs representing the recording mode and the effect applies to the multimedia file based on a frame rate, according to an embodiment as disclosed herein;

FIG. 3 is a flow chart illustrating a method for recording the multimedia file comprising at least one object in at least one of recording mode and effect, according to an embodiment as disclosed herein;

FIG. 4 is a flow chart illustrating a method for producing and playbacking the multimedia file comprising a first portion of the scene and a second portion of scene, according to an embodiment as disclosed herein;

FIGS. 5A-5D are examples of various techniques of displaying an unique identifier corresponding to at least one of the recording mode and the effect of the multimedia file, according to an embodiment as disclosed herein;

FIG. 6 is an example illustration for detecting a shape event and a sound event associated with a balloon and recording the multimedia file in at least one of the recording mode and the effect, when a secondary object is absent within the field of view (FOV) of the camera, according to an embodiment as disclosed herein.

FIG. 7 is an example illustration for detecting the shape event and the sound event associated with a bow and recording the multimedia file in at least one of the recording mode and the effect, according to an embodiment as disclosed herein;

FIG. 8 is an example illustration for detecting the shape event associated with a dolphin and recording the multimedia file in at least one of the recording mode and the effect, according to an embodiment as disclosed herein;

FIG. 9 is an example illustration for detecting the shape event associated with the balloon and recording the multimedia file in at least one of the recording mode and the effect, when the secondary object is present within the FOV of the camera in the electronic device, according to an embodiment as disclosed herein;

FIG. 10 is an example illustration for detecting the shape event associated with a hoop in a basketball court and recording the multimedia file in at least one of the recording mode and the effect, according to an embodiment as disclosed herein;

FIG. 11 is an example illustrating selection of a target and automatically recording an abnormal action performed by the target at higher frame rate, according to an embodiment as disclosed herein;

FIG. 12 is an example illustration for detecting the shape event associated with the balloon and recording the multimedia file in at least one of the recording mode and the effect, when the secondary object is present within the FOV of the camera in a wearable device, according to an embodiment as disclosed herein;

FIG. 13 is an example illustration for detecting the shape event and sound event associated with a vehicle and recording the multimedia file in at least one of the recording mode and the effect, according to an embodiment as disclosed herein; and FIG. 14 is an example illustration for capturing a plurality of objects by recording a plurality of multimedia files using a plurality of cameras and producing the multimedia file by merging the plurality of multimedia files in at least one of the recording mode and the effect, according to an embodiment as disclosed herein.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness. Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for recording a multimedia file using an electronic device. The method includes previewing a scene comprising a plurality of objects in a field of view of a camera of the electronic device and detecting at least one of a shape event and a sound event associated with at least one object from the plurality of objects in the scene. Further, the method includes determining at least one of a recoding mode and an effect for the at least one object based on at least of the sound event and the shape event and automatically applying at least one of the recording mode and the effect. The method also includes recording the multimedia file comprising the at least one object in at least one of the recording mode video and the effect and storing the multimedia file.

In the conventional methods and systems, the selection of the recording modes is entirely user-driven process wherein the user has to set the desired recording mode separately and has to do so repeatedly when required and cannot function in real time recording. Unlike to the conventional methods and systems, the proposed method is fully automatic and determines the recording mode and/or effects to be applied to the video based on the shape event and/or the sound event associated with the at least one object in the scene.

Unlike to the conventional methods and systems, the proposed method detects the contextually probable objects which might appear into the scene at a later point of time, therefore, the processing time required for determining the recording mode/effect becomes faster.

Referring now to the drawings, and more particularly to FIGS. 1A through 13, where similar reference characters denote corresponding features consistently throughout the figures, there are shown preferred embodiments.

FIG. 1A is a block diagram of the electronic device 100 for recording the multimedia file comprising the at least one object in at least one of the recording mode and the effect, according to an embodiment as disclosed herein. Referring to the FIG. 1A, the electronic device 100 can be, for example, a laptop, a Personal Computer, a mobile phone, a smart phone, Personal Digital Assistant (PDA), a tablet, a wearable device, or the like. In an embodiment, the electronic device 100 can include a camera 110, a voice management engine 120, a recording mode management engine 130, a processor 140, a memory 150 and a display 160.

In an embodiment, the camera 110 is configured to preview the scene comprising the plurality of objects within the field of view. Further, the camera 110 is also configured to record the multimedia file comprising the at least one object in at least one of the recording mode and the effect. The camera 110 is capable of capturing the multimedia file at variable frame rates. In an embodiment, the voice management engine 120 includes a microphone 122 and a voice detection engine 124. The microphone 122 in the voice management engine 120 is configured to receive the voice inputs from the user for selecting/providing the secondary objects in the form of voice commands. The voice detection engine 124 in the voice management engine 120 is also configured to determine the sound associated with the at least one object and provide the same to the recording mode management engine 130, which in turn determines whether the sound event has occurred. In an embodiment, the recording mode management engine 130 is configured to detect at least one of the shape event and the sound event associated with the at least one object from the plurality of objects in the scene. The shape event can be a sudden increase or decrease in the shape of the at least one object. For example, a tiger in a jungle which suddenly sees a prey and starts to chase the prey. There is the sudden change in the shape of the tiger. The sound event can be a sudden increase or decrease in the amplitude of the sound from the at least one object. For example, a bullet fired from a gun. A sudden fall of a glass bottle which breaks is an example of both the shape event and the sound event. The at least one object in the scene can be the primary object and the secondary object. Further, the recording mode management engine 130 is configured to determine at least one of the recoding mode and the effect for the at least one object based on at least of the sound event and the shape event and automatically apply at least one of the recording mode and the effect. The recoding mode can be for example, slow motion mode, fast motion mode, panorama mode, etc. The effect can be for example, focus-in, focus-out, etc. Further, the recording mode management engine 130 is configured to record the multimedia file comprising the at least one object in at least one of the recording mode and the effect.

In another embodiment, the recording mode management engine 130 is configured to record the first portion of the scene in at least one of the first recording mode and the first effect and detect at least one of the shape event and the sound event associated with at least one object while recording the scene. Further, the recording mode management engine 130 is configured to determine the second recording mode based on the shape event and the sound event and record the second portion of the scene in at least one of the second recording mode and the second effect. The recording mode management engine 130 is also configured to produce the multimedia file comprising the first portion of the scene and the second portion of the scene. The first recording mode and the second recording mode can be at least one of the fast motion mode, the slow motion mode. The recording mode management engine 130 also embeds the unique identifier corresponding to the first recoding mode on the timeline of the multimedia file while recording the first portion of the scene and the unique identifier corresponding to the second recoding mode on the timeline of the multimedia file while recording the second portion of the scene.

In an embodiment, the processor 140 is configured to interact with the hardware elements such as the camera 110, the voice management engine 120, the recording mode management engine 130, the memory 150 and the display 160.

In an embodiment, the memory 150 is configured to store the multimedia file comprising the recorded at least one object in at least one of the recording mode video and the effect. The memory 150 also includes an object database which stores key value pairs of object name and specimen image. The memory 150 also stores the primary object selected by the user when the electronic device 100 detects the plurality of objects in the scene. Further, the memory 150 also stores the secondary object determined based on the context of the primary object. The memory 150 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 150 may, in some examples, be considered a non-transitory storage medium. The term "non-transitory" may indicate that the storage medium is not embodied in a carrier wave or a propagated signal. However, the term "non-transitory" should not be interpreted that the memory 150 is non-movable. In some examples, the memory 150 is configured to store larger amounts of information than the memory. In certain examples, a non-transitory storage medium may store data that can, over time, change (e.g., in Random Access Memory (RAM) or cache).

In an embodiment, the display 160 is configured to display the scene comprising the plurality of objects and receive touch inputs from the user for selecting the objects, start/end of recording etc. Further, display 160 is configured to display the detected objects and preview and recording frames. Further, the display 160 is configured to display the unique identifier corresponding to the first recoding mode on the timeline of the multimedia file while recording the first portion of the scene and the unique identifier corresponding to the second recoding mode on the timeline of the multimedia file while recording the second portion of the scene. Further, the display 160 automatically displays the unique identifiers corresponding to the first recoding mode and the second recording mode on the timeline of the multimedia file while the user playbacks the stored multimedia file.

FIG. 1B illustrates the functions of the various elements of the recording mode management engine 130 while determining the at least one object and recording the multimedia file after applying at least one of the recording mode and the effect, according to an embodiment as disclosed herein.

In an embodiment, the recording mode management engine 130 includes an object detection engine 131, a frame prediction engine 132, a shape event detection engine 133, a sound event detection engine 134 and a frame rate determination engine 135. In an embodiment, the object detection engine 131 is configured to detect the relevant objects from the plurality of objects while previewing the scene. Further, the object detection engine 131 uses a combination of convolution neural networks (CNN) and context information to determine the objects in the scene. The object detection engine 131 unit takes input frames and determines the probable objects present in the scene, thereby reducing multiple levels of processing. In an embodiment, the frame prediction engine 132 is a deep predictive coding network for video prediction. The frame prediction engine 132 is configured to receive the input frames, perform learning on the input frames and predict future frames. The predicted future frames are sent to the object detection engine 131 to determine the contextually probable objects in the input frames. In an embodiment, the shape event detection engine 133 is configured to detect the shape change of the selected objects and determines the rate of shape change of objects. In an embodiment, the sound event detection engine 134 is configured to determine the sound pressure level (SPL) of the sound associated with the at least one object and determine whether the SPL of the sound associated with the at least one object meets a sound change criteria. When the sound associated with the at least one object meets the sound change criteria, the sound event is detected. The SPL change with respect to time can be re-expressed as a ratio r(t) between the current and the earlier signal power in linear scale like following equation:

$$r(t) = \frac{pow(t)}{pow(t - \Delta T)} \quad (1)$$

The current signal power pow (t) means the averaged signal power during $T_w$ (dead time between pulses) and is expressed as:

$$pow(t) = \frac{1}{T_w} \int_{t-T_w}^{t} p^2(t)dt \quad (2)$$

p(t) is the measured SPL from microphone 122.

The background noise, as its level varies slowly with respect to time or environment, is also included in the measured sound pressure. Small change in r(t) can be observed with respect to time when there are background noises alone. When a sudden loud sound occurs, then r(t) varies drastically and therefore a threshold $r_{thr}$ is introduced to discriminate whether the change of r(t) with respect to time is caused by the sudden loud sound or not. Therefore the sound event is detected using the equation (3) where sudden sound d (t) is defined as:

$$d(t) = \begin{cases} 1, & r(t) \geq r_{thr} \\ 0, & \text{otherwise} \end{cases} \quad (3)$$

In an embodiment, the frame rate determination engine 135 is configured to combine the output from the shape event $d_{ete}$ction engine 133 and the sound event detection engine 134 from a prior trained regression model and returns the predicted frame rate. If the predicted frame rate is different from the normal frame rate of the primary object then the focus-in effect is applied to the object and the frame rate is changed. Similarly if the predicted frame rate is different from the normal rate for the secondary object then only the frame rate is change. Further, based on the previous state of occurrence of the sound event or the shape event, the state is toggled to normal when the sound event or the shape event fades.

FIG. 1C is a block diagram of the object detection engine 131 for detecting the at least one object in the scene, according to an embodiment as disclosed herein.

The proposed method uses the CNN based model with context information to improve object detection and accuracy of detecting the at least one object in the scene. Further, the method uses supervised learning. The method of object detection includes localizing the object instances (hypotheses generation) in the scene and classifying the objects into semantic classes (hypotheses classification). The hypotheses are generated using features like symmetry, aspect ratio, expected position, color, and motion. Generally, the hypotheses classification method can be divided into shape based method and feature-based method. The proposed method the feature based method. The object detection engine 131 has a fusion system which combines the output from the CNN based Deep Learning (DL) classifier and the context-based classifiers. The context-based classifiers are designed using the naive Bayes method. The DL and the context-based classifiers scores are fused using the Bayes model. The object detection engine 131 is trained extensively using input frames to detect contextual objects in subsequent frames.

FIG. 1D is a block diagram of the frame prediction engine 132 of the recording mode management engine 130, according to an embodiment as disclosed herein.

The frame prediction engine 132 is a deep predictive coding network for video prediction which is initially trained. The frame prediction engine 132 uses unsupervised learning. The frame prediction engine 132 learns to predict the future frames in sequence in the multimedia file. Each layer within the frame prediction engine 132 makes local predictions and only forwards deviations from those predictions to subsequent layers. The predicted frames are sent for object detection in the object detection engine 131 for finding the probable objects from the predicted frames.

Referring to the FIG. 1D, the illustration of information flow within the layers of the frame prediction engine 132 is shown. Each layer consists of representation neurons ($R_1$), which output a layer-specific prediction at each time step ($A^{\wedge}_1$), which is compared against a target ($A_1$) to produce an error term ($E_1$), which is then propagated laterally and vertically in the network.

FIG. 1E is an example illustrating the method of detecting the shape event by the shape event detection engine 133, according to an embodiment as disclosed herein.

The shape event detection engine 133 includes a framework for shape event detection on a sequence of 2-D silhouettes f the deforming object which can be obtained from the sequence of frames by background subtraction and centroid alignment. A silhouette sequence is a video sequence in which each pixel is either zero (black) denoting background or one (white) denoting foreground (typically moving/deforming object). When an action segment is received, the shape event detection engine 133 extracts a collection of 13-dimensional shape which describe the geometry of the timeline of how the shape varies with time to, as shown in FIG. 1E. Further, for the calculated values of the 10 spatio-temporal distances for the object which experiences the shape event, the total change in the shape of the object with each frame is determined. If the difference between a sum of the 10 spatio-temporal distances is greater than a particular tuned threshold value, then the shape event is detected. Further, the rate of shape change is calculated with the help of the amount of shape change undergone by the object over a period of time.

FIG. 2A is a model of the frame rate determination engine 135 for determining the frame rate based on at least one of the shape event and the sound event associated with the at least one object, according to an embodiment as disclosed herein.

FIGS. 2B-2E are graphs representing the recording mode and the effect applies to the multimedia file based on a frame rate, according to an embodiment as disclosed herein.

Referring to the FIG. 2A, the frame rate determination engine 135 includes regression models such as linear regression to predict the frame rate. The frame rate determination engine 135 trained through a feature set which involves an input sound loudness, rate of shape change and an expected output (Frame rate). Further, the frame rate determination engine 135 learns to predict the frame rate based on the variables of sudden input sound and rate of shape change using equation (4):

$$Y = \beta_0 + \beta_1 X_1 + \beta_2 X_2 \qquad (4)$$

where:

$X_1$=Sudden sound, $X_2$=Rate of shape change, Y=Expected Frame rate, $\beta_1$=Coefficient for $X_1$, $\beta_2$=Coefficient of $X_2$, $\beta_0$=Intercept.

For example consider for a primary object in the scene the values are $X_1$=20, $X_2$=30, $\beta_1$=1, $\beta_2$=1, $\beta_0$=24. Therefore substituting the values in equation (4), ($F_1$) Y=24+20+30=74 fps, $F_{final1}$=(F+$F_1$)=24+74=98 fps.

In another example, consider for the primary object detected in the scene the values $X_1$=40, $X_2$=20, $\beta_1$=1, $\beta_2$=1, $\beta_0$24. Therefore, substituting the values in equation (4), ($F_2$) Y=24 +40+20=84 fps.

Since $F_2 \geq F_1$, $F_2$=$F_1$/2=74/2=35 fps. So $F_{final2}$=(F+$F_2$)=24+35=59 fps. Assuming normal frame rate as F (Usually 24, 30 fps).

The frame rate for shape/sound events detected in primary objects ($F_1$) is derived from curve for (4). The negative values are derived from the curve if the shape/sound events is gradual (slow shape change) and positive values when shape/sound events occurs suddenly (sudden sound/+high rate of shape change). The final frame rate of recording for video with shape/sound events for the primary object is then $F_{final1}$=(F+$F_1$). If $F_{final1}$ is different from normal frame rate F then intent is sent for focusing in on the object and changing frame rate to $F_{final1}$ to camera. Therefore when the primary object experiences a shape/sound event then the frame rate (F1*) is increased and focus in effect is provided, as shown in FIG. 2B.

The frame rates ($F_2$) are assigned from curve (4) if the interesting events are detected in secondary objects. This value is normalized w.r.t $$\begin{pmatrix} F2 \geq F1 \\ F2 < F1 \end{pmatrix} \begin{matrix} F2 = F1/2 \\ F2 = F2 \end{matrix} \qquad (5)$$

The final frame rate for secondary object event is then $F_{final2}$=(F+$F_2$). If $F_{final2}$ is different from normal frame rate F then intent is sent for changing frame rate to $F_{final2}$ Based on the last stage at which the event based intents are sent, the state is toggled between normal frame rate and focus out. Therefore when the secondary object experiences a shape/sound event then the frame rate (F2*) is increased, as shown in FIG. 2C.

When there is no sudden shape/sound event detected or when the shape/sound event happens gradually then the frame rate is decreased (F1' and F2'*) and the decrease for all the objects in the scene, as shown in FIG. 2D. When the sound fades away and/or the shape change stops the normal mode of recording is restored. Furthermore, the combined values of the shape event and the sound event are shown in FIG. 2E, which is obtained by the regression model in the frame rate determination engine 135.

FIG. 3 is a flow chart 300 illustrating a method for recording the multimedia file comprising the at least one object in at least one of the recording mode and the effect, according to an embodiment as disclosed herein.

Referring to the FIG. 3, at step 302, the electronic device 100 previews the scene comprising the plurality of objects in the field of view of the camera 110. For example, in the electronic device 100 as illustrated in the FIG. 1A, the camera 110 is configured to preview the scene comprising the plurality of objects within the field of view of the camera 110.

At step 304, the electronic device 100 determines the sound pressure level (SPL) of the sound associated with the at least one object. At step 306, the electronic device 100 determines whether the SPL of sound associated with at least one object meets the sound criteria. On determining that the SPL of sound associated with at least one object meets the sound criteria, at step 308, the electronic device 100 detects the at least one of the shape event and the sound event associated with the at least one object. At step 310, the electronic device 100 determines at least one of the recoding mode and the effect for the at least one object based on at least of the sound event and the shape event. At step 312, the electronic device 100 automatically applies at least one of the recording mode and the effect. At step 314, the electronic device 100 records the multimedia file comprising the at least one object in at least one of the recording mode and the effect and store the multimedia file. At step 316, the electronic device 100 obtains the plurality of frames associated with the at least one object. At step 318, the electronic device 100 determines the difference in at least one region of the at least one object in each of the frames. At step 320, the electronic device 100 determines the rate of change in the at least one region of the at least one object in each of the frames. At step 322, the electronic device 100 determines whether the rate of change in the at least one region of the at least one object in each of the frames meets the shape criteria. Further, on determining that the rate of change in the at least one region of the at least one object in each of the frames meets the shape criteria, the electronic device 100 loops to step 310 and performs the steps 310 to 314 as explained above. The steps from step 304 to step 322 are performed by the recording mode management engine 130 of the electronic device 100, as depicted in FIG. 1A.

FIG. 4 is a flow chart 400 illustrating a method for producing and playbacking the multimedia file comprising the first portion of the scene and the second portion of the scene, according to an embodiment as disclosed herein.

Referring to the FIG. 4, at step 402, the electronic device 100 records the first portion of the scene in at least one of the first recording mode and the first effect. At step 404, the electronic device 100 detects at least one of the shape event and the sound event associated with the at least one object while recording the scene. At step 406, the electronic device 100 determines the second recording mode based on the shape event and the sound event. At step 408, the electronic device 100 records the second portion of the scene in at least one of the second recording mode and the second effect. At step 410, the electronic device 100 produces the multimedia file comprising the first portion of the scene and the second portion of the scene. At step 412, the electronic device 100 stores the multimedia file. For example, in the electronic device 100 as illustrated in the FIG. 1A, the memory 150 is configured to store the multimedia file.

At step 414, the electronic device 100 playbacks the multimedia file. At step 416, the electronic device 100 automatically displays the unique identifier corresponding to the recoding mode on the timeline of the multimedia file. For example, in the electronic device 100 as illustrated in the FIG. 1A, the display 160 is configured to automatically display the unique identifier corresponding to the recoding mode on the timeline of the multimedia file. At step 418, the electronic device 100 playbacks the first portion in the first recording mode and the second portion in the second recording mode. The steps from step 402-410, step 414 and step 418 are performed by the recording mode management engine 130 of the electronic device 100, as depicted in FIG. 1A.

FIGS. 5A-5D are examples of various techniques of displaying an unique identifier corresponding to at least one of the recording mode and the effect of the multimedia file, according to an embodiment as disclosed herein.

Referring to the FIG. 5A, at 502a, the primary object in the frame is the bow. The electronic device 100 determines the shape event in the primary object. Further, based on the shape event in the primary object, the electronic device 100 determines at least one of the recoding mode and the effect to be applied while recording the multimedia file comprising the primary object. Further, the recording mode is changed by increasing the frame rate and the effect of focus-in is applied to highlight the primary object on the screen. The increase in the frame rate of the multimedia file is represented by providing the unique identifier such as a color variation of the timeline as compared to the normal frame rate of the multimedia file. Further, a representation of the primary object is also provided on the timeline of the multimedia file. At 504a, the secondary object is captured when the sound event is detected. Further, based on the sound event due to the secondary object, the electronic device 100 determines at least one of the recoding mode and the effect to be applied while recording the multimedia file comprising the secondary object. Further, the recording mode is changed by increasing the frame rate as compared to the normal frame rate of the multimedia file to highlight the secondary object on the screen. The increase in the frame rate of the multimedia file is represented by providing the unique identifier such as a color variation of the timeline as compared to the normal frame rate and the frame rate provided for the primary object of the multimedia file. Further, a representation of the secondary object is also provided on the timeline of the multimedia file. In conjunction with the FIG. 5A, in FIG. 5B, at 502b, the increase in the frame rate of the multimedia file is represented by providing the unique identifier such as a graphical representation with color variation of the timeline as compared to the normal frame rate of the multimedia file. At 504b, the increase in the frame rate of the multimedia file is represented by providing the unique identifier such as the graphical representation with color variation of the timeline as compared to the normal frame rate and the frame rate provided for the primary object of the multimedia file.

In conjunction with the FIG. 5A, in FIG. 5C, at 502c, the increase in the frame rate of the multimedia file is represented by providing the unique identifier such as a zig-zag timeline with color variation as compared to the normal frame rate of the multimedia file. At 504c, the increase in the frame rate of the multimedia file is represented by providing the unique identifier such as the zig-zag timeline with color variation as compared to the normal frame rate and the frame rate provided for the primary object of the multimedia file.

In conjunction with the FIG. 5A, in FIG. 5D, at 502d, along with the unique identifier such as the graphical representation with color variation of the timeline as compared to the normal frame rate of the multimedia file, the increased frame rate 240 FPS is also displayed on the timeline of the multimedia file. Similarly, the frame rate of capturing the secondary object i.e., 120 FPS is also displayed on the timeline of the multimedia file. However, the frame rate applied to capture the primary object is always greater than the frame rate used to capture the secondary object in the scene, which is indicated by a change in the unique identifier for the primary object and the secondary object.

FIG. 6 is an example illustration for detecting a shape event and a sound event associated with a balloon and recording the multimedia file in at least one of the recording mode and the effect, when a secondary object is absent within the field of view (FOV) of the camera, according to an embodiment as disclosed herein.

Referring to the FIG. 6, at 602, the electronic device 100 provides the preview of the scene comprising the primary object i.e., the balloon within the FOV of the camera 110 of the electronic device 100. At step 604, the user identifies the balloon as the primary object in the preview of the scene. Further, the electronic device 100 can also identify the primary object automatically in the preview of the scene.

At step 606, the electronic device 100, suggests the secondary object (s) which are contextually related to the primary object in the scene and which is not present in the preview of the scene displayed in the camera 110. In case the secondary object (s) which the user wants to introduce to in the scene is not suggested by the electronic device 100, then the user can provide voice commands to the electronic device 100 to add the secondary object (s). At step 608, the user selects the required secondary object as a bullet. At step 610 and step 612, the electronic device 100 detects the shape event and determines the sound event associated with the primary object due to the secondary object i.e., when the bullet strikes the balloon the balloon blasts creating a sudden sound and instant change in the shape. Further, the electronic device 100 determines the recoding mode and the effect that can be applied to capture the primary object and the secondary object and records the video after applying the recording mode and the effect. The blasting of the balloon can be captured in the recording mode such as the slow motion along with the effect such as a focus-in to clearly capture the change in shape and sound of the balloon.

In the conventional methods and systems, the user has to manually change the recording mode/effects while capturing the events. Therefore, there are possibilities that the events/moments which are important to the user may be missed by the time the user recognized the recording mode/effects etc. Unlike to the conventional methods and systems, the proposed method automatically determines the recording mode/effects to be applied while capturing the events based on the sudden sound change/shape change of the primary object, which is of interest to the user.

FIG. 7 is an example illustration for detecting the shape event and the sound event associated with a bow and recording the multimedia file in at least one of the recording mode and the effect, according to an embodiment as disclosed herein.

Referring to the FIG. 7, at step 702, consider that the user is previewing an archer with a bow and arrow, within the field of view of the camera of the electronic device 100. The electronic device 100 automatically detects the plurality of objects within the field of view of the camera i.e., the archer and the bow. Further, the user selects the bow as the primary object in the scene. At step 704, the electronic device 100 automatically determines the secondary object which is contextual associated with the primary object and displays the suggestion of the secondary objects to the user. The user selects the secondary object of choice out of the plurality of secondary objects provided by the electronic device 100. If the secondary object of choice of the user is not provided by the electronic device 100, then the user can add the secondary object by providing voice commands, etc. Further, at step 706, the electronic device 100 displays the primary object and secondary object on the screen and also stores the determined primary object and secondary object in the object database. After the selection phase, at step 708, the user begins recording the multimedia file and the electronic device 100 detects the primary object within the field of view of the camera based on the learning. Further, at step 710, the electronic device 100 stores the primary object in the object database.

At step 712, the electronic device 100 detects the shape event and the sound event associated with the bow in the scene. Therefore, the electronic device 100 determines the recoding mode as slow motion mode and the effect as in-focus (i.e., zoom-in and capture) for capturing the primary object based on the sound event and the shape event. At step 714, the electronic device 100 automatically applies the slow motion mode and the in-focus effect and records the multimedia file. The slow motion mode applied to the primary object while recording is indicated by the unique identifier on the timeline of the multimedia file, i.e., a step-up pattern in the timeline. Further, when the shape event and the sound event associated with the bow is no longer determined by the electronic device 100, then the electronic device 100 switches to normal mode and continues to record the multimedia file, which is indicated by the straight line in the timeline of the multimedia file. At step 716, when the frame comprising of the secondary object is received by the electronic device 100, then a sound verification is performed between the primary object and the secondary object. Further, when the sound event is detected with respect to the secondary object, then the electronic device 100 determines the recording mode to be applied to capture the secondary object as the slow motion mode and at step 718, switches to slow motion mode while recording the multimedia file. The slow motion mode applied to the secondary object while recording is indicated by the unique identifier on the timeline of the multimedia file, i.e., a step-up pattern in the timeline. However, the height of the step-up pattern is smaller when compared to the step-up pattern indicating the primary object. This is because the frame rate increase for primary object is always greater than the frame rate increase for the secondary object. At step 720, when the sound fades away, the electronic device 100 switches to normal mode for recording the multimedia file. Once the user completes the recording of the multimedia file, the multimedia file is stored in the electronic device 100. Furthermore, when the user playbacks the multimedia file, the electronic device 100 automatically displaying the unique identifiers corresponding to the recoding mode of the primary object and second recording mode of the secondary object on the timeline of the multimedia file and playbacks the corresponding portions of the multimedia files in the respective recording modes.

FIG. 8 is an example illustration for detecting the shape event associated with a dolphin and recording the multimedia file in at least one of the recording mode and the effect, according to an embodiment as disclosed herein.

Referring to the FIG. 8, at step 802, consider that the user is previewing a scene which includes a still water view. At step 804, the electronic device 100 automatically determines the object which is contextual associated with the scene i.e., a dolphin and displays the suggestion of the objects on the screen of the electronic device 100. The user selects the object of choice out of the plurality of objects provided by the electronic device 100. If the object of choice of the user is not provided by the electronic device 100, then the user can add the object by providing voice commands, etc. Further, the electronic device 100 displays the object on the screen and also stores the determined object in the object database. After the selection phase, at step 806, the user begins recording the multimedia file. At step 808, the electronic device 100 detects the dolphin within the field of view of the camera and begins to record in normal mode. At step 810, the electronic device 100 detects the shape event associated with the dolphin in the scene. Therefore, the electronic device 100 determines the recoding mode as slow motion mode and the effect as in-focus (i.e., zoom-in and capture) for capturing the dolphin based on the shape event. From step 810 to 814, the electronic device 100 automatically applies the slow motion mode and the in-focus effect and records the multimedia file where the entire shape event of the dolphin is captured. The slow motion mode applied to capture the dolphin while recording is indicated by the unique identifier on the timeline of the multimedia file, i.e., a step-up pattern in the timeline. Further, when the shape event associated with the dolphin is no longer determined by the electronic device 100, the electronic device 100 switches to normal mode and continues to record the multimedia file. Furthermore, when the user playbacks the multimedia file comprising the dolphin, the electronic device 100 automatically displays the unique identifiers corresponding to the recoding mode of the dolphin on the timeline of the multimedia file and playbacks the corresponding portions of the multimedia files in the respective recording modes.

FIG. 9 is an example illustration for detecting the shape event associated with the balloon and recording the multimedia file in at least one of the recording mode and the effect, when the secondary object is present within the FOV of the camera in the electronic device, according to an embodiment as disclosed herein.

Referring to the FIG. 9, at step 902, consider that the user is previewing a scene which includes the user's hand with a pin approaching the balloon. The electronic device 100 automatically detects the plurality of objects within the field of view of the camera i.e., the balloon and the user's hand. At step 904, the user selects the balloon as the at least one object of interest in the scene. At step 906, the electronic device 100 displays the balloon selected by the user as an image on the screen of the electronic device 100 and also stores the determined object in the object database. After the selection phase, at step 908, the user begins recording the multimedia file and detects a shape event associated with the balloon at step 910. At step 912, the electronic device 100 determines the recoding mode as fast motion mode and the effect as in-focus for capturing the balloon based on the shape event. From step 912 to 916, the electronic device 100 automatically applies the fast motion mode and the in-focus effect and records the multimedia file where the entire shape event of the balloon is captured. The fast motion mode applied to capture the balloon while recording is indicated by the unique identifier on the timeline of the multimedia file, i.e., a step-down pattern in the timeline. Further, when the shape event associated with the balloon is no longer determined by the electronic device 100, the electronic device 100 switches to normal mode and continues to record the multimedia file after step 916. Furthermore, when the user playbacks the multimedia file comprising the balloon, the electronic device 100 automatically displays the unique identifiers corresponding to the recoding mode of the balloon on the timeline of the multimedia file and playbacks the corresponding portions of the multimedia files in the respective recording modes.

FIG. 10 is an example illustration for detecting the shape event associated with a hoop in a basketball court and recording the multimedia file in at least one of the recording mode and the effect, according to an embodiment as disclosed herein.

Referring to the FIG. 10, at step 1002, consider that the user is previewing a scene of a basketball court. The electronic device 100 is not able to detect the primary object within the scene due to the presence of the plurality of objects within the field of view of the camera. Therefore, at step 1004, the user provides the voice input indicating the primary object as hoop for the basketball, the shape event of which has to be captured by the electronic device 100. The electronic device 100 displays the at hoop as an image on the screen of the electronic device 100 and also stores the hoop in the object database. After the selection phase, at step 1006 and 1008, the user begins recording the multimedia file in the normal mode and detects a shape event associated with the hoop. At step 1010, the electronic device 100 determines the recoding mode as slow motion mode and the effect as in-focus for capturing the shape event associated with the hoop. From step 1010 to 1012, the electronic device 100 automatically applies the slow motion mode and the in-focus effect and records the multimedia file where the entire shape event of the hoop is captured. The slow motion mode applied to capture the balloon while recording is indicated by the unique identifier on the timeline of the multimedia file, i.e., a step-up pattern in the timeline. At step 1014, when the shape event associated with the hoop is no longer determined by the electronic device 100, the electronic device 100 switches to normal mode and continues to record the multimedia file. Furthermore, when the user playbacks the multimedia file comprising the hoop, the electronic device 100 automatically displays the unique identifiers corresponding to the recoding mode of the hoop on the timeline of the multimedia file and playbacks the corresponding portions of the multimedia files in the respective recording modes.

FIG. 11 is an example illustrating selection of a target and automatically recording an abnormal action performed by the target at higher frame rate, according to an embodiment as disclosed herein.

In general, security applications are highly dependent on tracking various suspicious targets and actions associated with the suspicious targets. Therefore, the suspicious target can be selected and the actions associated with the suspicious target can be recorded based on the shape event and the sound event automatically at a higher frame rate. Further, the multimedia file comprising the suspicious target can be analyzed due to the higher frame rate at which the multimedia file is captured. Consider a scenario that a thief has entered a shop with a gun in hand. In the preview mode of the camera, the user of the electronic device 100 selects the object i.e., a gun, which needs to be monitored. At step 1102, the electronic device 100 determines that gun has suddenly appeared in the scene being captured within the field of view of the camera. Further, at step 1104, the electronic device 100 determines the shape event associated with the gun and records the multimedia file with an increased frame rate.

FIG. 12 is an example illustration for detecting the shape event associated with the balloon and recording the multimedia file in at least one of the recording mode and the effect, when the secondary object is present within the FOV of the camera in a wearable device, according to an embodiment as disclosed herein.

In conjunction with FIG. 9, referring to the FIG. 12, at step 1202, the wearable device 100 with the camera can also be used to preview the scene comprising the plurality of objects. Further, after the selection phase, from step 1204 to 1208, the user records the multimedia file and detects a shape event associated with the balloon. The wearable device 100 determines the recoding mode and the effect for capturing the balloon based on the shape event. Further, the wearable device 100 automatically applies the determined recording mode and the effect and records the multimedia file. The recording mode applied to the balloon while recording is indicated by the unique identifier on the screen of the wearable device 100 i.e., a pie chart.

FIG. 13 is an example illustration for detecting the shape event and sound event associated with a vehicle and recording the multimedia file in at least one of the recording mode and the effect, according to an embodiment as disclosed herein.

Referring to the FIG. 13, consider a dashboard camera of the vehicle. The dashboard camera previews the vehicles on the road, as shown in step 1302. At step 1304, the dashboard camera automatically determines a particular vehicle which is over speeding as the primary object. At step 1306, the dashboard camera begins recording the multimedia file which contains the primary object. At step 1308, the electronic device 100 detects a sudden shape event and sound event associated with the primary object due to the primary object (i.e., the over speeding vehicle) hitting another vehicle on the road. The dashboard camera starts to record the multimedia file in the slow motion mode with focus-in effect to capture the registration number details, etc, of the primary object. At step 1310, the vehicle having the dashboard camera surpasses the primary object, the dashboard camera continues to record the multimedia file containing the vehicles on the road in the normal mode. Furthermore, when the user playbacks the multimedia file comprising the over speeding vehicle, the electronic device 100 automatically displays the unique identifiers corresponding to the recoding mode of the over speeding vehicle on the timeline of the multimedia file and playbacks the corresponding portions of the multimedia files in the respective recording modes. Therefore, the proposed method can be used by law enforcement agencies to easily track traffic violating vehicles as the dashboard cameras in vehicles can be used to capture the registration details of traffic violating vehicles.

FIG. 14 is an example illustration for capturing a plurality of objects by recording a plurality of multimedia files using a plurality of cameras and producing the multimedia file by merging the plurality of multimedia files in at least one of the recording mode and the effect, according to an embodiment as disclosed herein. The electronic device 100 having more than one camera can be used to capture the primary object and the secondary object respectively using a first camera and a second camera of the more than one camera. At step 1402, the user selects the primary object from the view provided by the first camera and the secondary object from the view provided by the second camera of the electronic device 100. At step 1404, the electronic device 100 tracks the primary object and determines at least one of the shape event and the sound event associated with the primary object. Further, the electronic device 100 using the first camera. Further, the electronic device 100 also tracks the v object and determines at least one of the shape event and the sound event associated with the secondary object using the second camera. Further, the electronic device 100 determines and applied the recording mode and the effect to be applied to the primary object and the secondary object by the respective cameras while recording the multimedia file, as shown in step 1404 and 1406. Further, at step 1408, the electronic device 100 merges the frames of the primary object recorded using the first camera and the frames of the secondary object recorded using the secondary camera to produce a single multimedia file comprising the recording modes and effects applied to both the primary object and the secondary object.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by an electronic device for recording a multimedia file, the method comprising:
   previewing a first scene comprising a plurality of objects in a field of view of a camera of the electronic device;
   detecting a shape event and a sound event associated with at least two objects for the first scene, wherein the at least two objects include a primary object among the plurality of objects in the first scene and a secondary object related to the primary object and not present in the preview of the first scene, wherein the secondary object is determined based on context information of the primary object, and wherein the shape event comprises a deformation of the at least two objects or a change of a state of movement of the at least two objects;
   determining a recording mode and an effect for the at least two objects based on the shape event and the sound event;
   applying the recording mode and the effect to a second scene;
   recording a multimedia file for the second scene comprising the at least two objects applied with the recording mode and the effect; and
   storing, in the electronic device, the multimedia file comprising the recorded at least two objects applied with the recording mode and the effect.

2. The method of claim 1, wherein the detecting of the sound event associated with the at least two objects comprises:
   determining a sound pressure level (SPL) of a sound associated with the at least two objects;
   determining whether the SPL of the sound associated with the at least two objects meets a sound change criteria; and
   detecting the sound event associated with the at least two objects when the SPL of the sound meets the sound change criteria.

3. The method of claim 1, wherein the detecting of the shape event associated with the at least two objects comprises:
   obtaining a plurality of frames associated with the at least two objects;
   determining a difference in at least one region for the at least two objects in each of the frames based on a distance from a centroid to each of edges of the at least two objects;
   determining a rate of change in the at least one region for the at least two objects in each of the frames based on the distance from the centroid to each of the edges of the at least two objects;
   determining whether the rate of change in the at least one region for the at least two objects in each of the frames meets a shape criteria; and
   detecting the shape event associated with the at least two objects, when the rate of change meets the shape criteria.

4. The method of claim 1, wherein the determining the recording mode and the effect for the at least two objects comprises:
   determining a frame rate based on the shape event and the sound event associated with the at least two objects; and
   determining the recording mode and the effect for the at least two objects based on the frame rate.

5. The method of claim 1, wherein the secondary object is dynamically determined by:
   providing at least one preview frame of the first scene comprising the primary object based on a machine learning model;
   determining the context information based on a Convolutional Neural Network (CNN) based model; and
   determining the secondary object associated with the primary object based on the context information.

6. The method of claim 1, wherein the recording mode includes at least one of a slow motion mode, a fast motion mode, or a panorama mode, and
   wherein the effect includes at least one of a focus-in, or a focus-out.

7. A method performed by an electronic device for recording a multimedia file, the method comprising:
   recording a first portion of a scene based on a first recording mode and a first effect, wherein a first identifier corresponding to the first recording mode is displayed on a timeline of a multimedia file while recording the first portion of the scene;
   detecting a shape event and a sound event associated with at least two objects while recording the first portion of the scene, wherein the at least two objects include a primary object among a plurality of objects in the scene and a secondary object related to the primary object and not present in a preview of the scene, wherein the secondary object is determined based on context information of the primary object, and wherein the shape event comprises a deformation of the at least two objects or a change of a state of movement of the at least two objects;
   determining a second recording mode and a second effect based on the shape event and the sound event;
   recording a second portion of the scene based on the second recording mode and the second effect, wherein a second identifier corresponding to the second recording mode is displayed on the timeline of the multimedia file while recording the second portion of the scene;

generating a multimedia file comprising the first portion of the scene and the second portion of the scene; and storing, in the electronic device the multimedia file.

8. The method of claim 7, further comprising:

playing back the multimedia file;

displaying the first identifier corresponding to the first recording mode and the second identifier corresponding to the second recording mode on the timeline of the multimedia file; and playing back the first portion in the first recording mode and the second portion in the second recording mode.

9. The method of claim 7, wherein the recording the first portion of the scene based on the first recording mode and the first effect comprises:

detecting the shape event and the sound event associated with at least two objects;

determining a third recording mode and a third effect for the at least two objects based on the shape event and the sound event;

applying the third recording mode and the third effect; and recording the first portion of the scene based on the third recording mode and the third effect.

10. The method of claim 7, wherein the determining the second recording mode and the second effect based on the shape event and the sound event comprises:

determining a frame rate based on the shape event and the sound event associated with at least two objects; and determining the second recording mode and the second effect for the at least two objects based on the frame rate.

11. The method of claim 7, wherein the detecting of the sound event associated with the at least two objects comprises:

determining a sound pressure level (SPL) of a sound associated with the at least two objects;

determining whether the SPL of the sound associated with the at least two objects meets a sound change criteria; and detecting the sound event associated with the at least two objects when the SPL of the sound meets the sound change criteria.

12. The method of claim 7, wherein the first recording mode and the second recording mode include at least one of a slow motion mode, a fast motion mode, or a panorama mode, and wherein the first effect and the second effect include at least one of a focus-in, or a focus-out.

13. An electronic device for recording a multimedia file, the electronic device comprising:

a memory;

a processor coupled to the memory; and a recording mode management engine coupled to the memory and the processor, wherein the recording mode management engine is configured to:

preview a first scene comprising a plurality of objects in a field of view of a camera of the electronic device;

detect a shape event and a sound event associated with at least two objects for the first scene, wherein the at least two objects include a primary object among the plurality of objects in the first scene and a secondary object related to the primary object an not present in the preview of the first scene, wherein the secondary object is determined based on context information of the primary object, and wherein the shape event comprises a deformation of the at least two objects or a change of a state of movement of the at least two objects;

determine a recording mode and an effect for the at least two objects based on the shape event and the sound event;

apply the recording mode and the effect to a second scene;

record a multimedia file for the second scene comprising the at least two objects applied with the recording mode and the effect; and store, in the memory, the multimedia file comprising the recorded at least two objects applied with the recording mode and the effect.

14. The electronic device of claim 13, wherein in order to detect the sound event associated with the at least two objects, the recording mode management engine is configured to:

determine a sound pressure level (SPL) of a sound associated with the at least two objects;

determine whether the SPL of the sound associated with the at least two objects meets a sound change criteria; and detect the sound event associated with the at least two objects when the SPL of the sound meets the sound change criteria.

15. The electronic device of claim 13, wherein in order to determine the recording mode and the effect for the at least two objects, the recording mode management engine is configured to:

determine a frame rate based on the shape event and the sound event associated with the at least two objects; and determine the recording mode and the effect for the at least two objects based on the frame rate.

16. The electronic device of claim 13, wherein the recording mode includes at least one of a slow motion mode, a fast motion mode, or a panorama mode, and wherein the effect includes at least one of a focus-in, or a focus-out.

17. An electronic device for recording a multimedia file, the electronic device comprising:

a memory;

a processor coupled to the memory; and a recording mode management engine coupled to the memory and the processor, wherein the recording mode management engine is configured to:

record a first portion of a scene based on a first recording mode and a first effect, wherein a first identifier corresponding to the first recording mode is displayed on a timeline of a multimedia file while recording the first portion of the scene;

detect a shape event and a sound event associated with at least two objects while recording the first portion of the scene, wherein the at least two objects include a primary object among a plurality of objects in the scene and a secondary object related to the primary object and not present in a preview of the scene, wherein the secondary object is determined based on context information of the primary object, and wherein the shape event comprises a deformation of the at least two objects or a change of a state of movement of the at least two objects;

determine a second recording mode and a second effect based on the shape event and the sound event;

record a second portion of the scene based on the second recording mode and the second effect, wherein a second identifier corresponding to the second recording mode is displayed on the timeline of the multimedia file while recording the second portion of the scene;

generate a multimedia file comprising the first portion of the scene and the second portion of the scene; and store, in the memory, the multimedia file.

18. The electronic device of claim 17, wherein in order to detect the sound event associated with the at least two objects, the recording mode management engine is configured to:

determine a sound pressure level (SPL) of a sound associated with the at least two objects;

determine whether the SPL of the sound associated with the at least two objects meets a sound change criteria; and detect the sound event associated with the at least two objects when the SPL of the sound meets the sound change criteria.

19. The electronic device of claim 14, wherein in order to determine the second recording mode and the second effect for the at least two objects, the recording mode management engine is configured to:

determine a frame rate based on the shape event and the sound event associated with the at least two objects; and determine the second recording mode and the second effect for the at least two objects based on the frame rate.

20. The electronic device of claim 17, wherein the first recording mode and the second recording mode include at least one of a slow motion mode, a fast motion mode, or a panorama mode, and wherein the first effect and the second effect include at least one of a focus-in, or a focus-out.

\* \* \* \* \*